(12) United States Patent
Miller

(10) Patent No.: US 11,057,519 B1
(45) Date of Patent: Jul. 6, 2021

(54) ARTIFICIAL INTELLIGENCE BASED REFINEMENT OF AUTOMATIC CONTROL SETTING IN AN OPERATOR INTERFACE USING LOCALIZED TRANSCRIPTS

(71) Applicant: OPEN TEXT HOLDINGS, INC., San Mateo, CA (US)

(72) Inventor: Donald Russ Miller, Fort Worth, TX (US)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 0 days.

(21) Appl. No.: 16/785,298

(22) Filed: Feb. 7, 2020

(51) Int. Cl.
| H04M 3/51 | (2006.01) |
| G06Q 10/06 | (2012.01) |
| G10L 15/193 | (2013.01) |
| G10L 15/16 | (2006.01) |
| G10L 15/26 | (2006.01) |

(52) U.S. Cl.
CPC .... H04M 3/5166 (2013.01); G06Q 10/06395 (2013.01); G06Q 10/06398 (2013.01); G10L 15/16 (2013.01); G10L 15/193 (2013.01); G10L 15/26 (2013.01); H04M 3/5191 (2013.01); H04M 2203/301 (2013.01); H04M 2203/401 (2013.01); H04M 2203/402 (2013.01)

(58) Field of Classification Search
CPC ............. H04M 3/5166; H04M 3/5191; H04M 2203/301; H04M 2203/402; G06Q 10/06395; G06Q 10/06398; G10L 15/16; G10L 15/193; G10L 15/26

USPC ................................ 379/88.22, 88.25, 88.26
See application file for complete search history.

(56) References Cited

U.S. PATENT DOCUMENTS

| 6,038,544 | A | 3/2000 | Machin et al. |
| 6,604,084 | B1 | 8/2003 | Powers |
| 9,350,808 | B2 * | 5/2016 | Beck ....................... G06F 16/30 |
| 9,742,914 | B2 * | 8/2017 | Surdick ............... H04M 3/5175 |
| 2002/0128898 | A1 | 9/2002 | Smith |
| 2003/0105659 | A1 | 6/2003 | Eisenstein |
| 2008/0010351 | A1 | 1/2008 | Wardhaugh |

(Continued)

OTHER PUBLICATIONS

Office Action for U.S. Appl. No. 15/958,960, dated Oct. 28, 2020, 18 pgs.

(Continued)

*Primary Examiner* — Binh Kien Tieu
(74) *Attorney, Agent, or Firm* — Sprinkle IP Law Group

(57) ABSTRACT

A data processing system for artificial intelligence-based setting of controls in an evaluation interface comprising a data store storing: a plurality of transactions; a plurality of completed evaluations, each completed evaluation including an indication of a transcript portion associated with an evaluation answer. The system determines a word or phrase common to a first set of transcript portions associated with the evaluation answer; creates a first set of auto answer parameters that includes the word or phrase; auto answers the question for a set of test transactions to generate an auto answer for each test transaction; and based on a determination that the first set of auto answer parameters auto answered the question with a threshold level of accuracy, configures an evaluation system to use the first set of auto answer parameters to preset an answer control in an evaluation operator interface.

20 Claims, 20 Drawing Sheets

(56) References Cited

U.S. PATENT DOCUMENTS

| | | |
|---|---|---|
| 2011/0055202 A1 | 3/2011 | Heimendinger |
| 2011/0206198 A1* | 8/2011 | Freedman ............... H04M 3/51 |
| | | 379/265.03 |
| 2013/0108242 A1* | 5/2013 | Oliver ............... H04N 21/4668 |
| | | 386/244 |
| 2014/0272914 A1* | 9/2014 | Baraniuk ................ G09B 7/00 |
| | | 434/362 |
| 2015/0356578 A1 | 12/2015 | Li |
| 2016/0180360 A1 | 6/2016 | Tietzen |
| 2016/0196522 A1 | 7/2016 | Niu |
| 2016/0277577 A1 | 9/2016 | Yentis |
| 2019/0325464 A1 | 10/2019 | Wood |
| 2019/0335038 A1* | 10/2019 | Alonso Y Caloca ....................... |
| | | H04M 3/5175 |
| 2019/0354598 A1* | 11/2019 | Graff ..................... G06F 40/284 |
| 2019/0362645 A1* | 11/2019 | Miller ................... G06N 5/041 |

OTHER PUBLICATIONS

OpenTextTM Qfiniti User Guide, Version 16.3, Open Text Corporation, Waterloo, CA, Oct. 24, 2017, 634 pgs.

OpenTextTM, What's New in OpenText Qfiniti 16, Version 16.3, Open Text WFO Software, Addison, Texas, Oct. 25, 2017, 105 pgs.

Autonomy Qfiniti User Guide Version 3.5 SP2 Document Revision 3, Autonomy, Inc., San Francisco, CA, May 31, 2012, 590 pgs.

Office Action for U.S. Appl. No. 15/984,125, dated Feb. 17, 2021, 18 pgs.

* cited by examiner

770

General Information     ☐ Publish

Answers     Weighted [Yes ▼]

Attributes

☐ Enable Auto Answer —772
Auto Answer [Select One ▼]—774
Target Answer [Select One ▼]—776

Add an Answer Template

Name [_____]—802
Description [_____]—804

Type [Radio Buttons ▼]—806

(Add) (Edit) (Remove)

| Name | Score | AutoScore Low | AutoScore High |
|------|-------|---------------|----------------|
|      |       |               |                |

810     (Save) (Cancel)

FIG. 8

| Name | Question Score | AutoScore Low | AutoScore High |
|---|---|---|---|
| Yes | 10 | 90 | 100 |
| No | 0 | 0 | 10 |

| Name | Question Score | AutoScore Low | AutoScore High |
|---|---|---|---|
| Excellent | 25 | 81 | 100 |
| Exceeds Expectations | 20 | 61 | 80 |
| Meets Expectations | 10 | | |
| Needs Improvement | 5 | | |
| Poor | 0 | 0 | 20 |

Standard Company Greeting AutoScore Template

| Transaction | AutoScore Answer | Evaluator Answer | AutoScore Answer Changed |
|---|---|---|---|
| 1 | Yes | Yes | No |
| 2 | Yes | No | Yes |
| ○○○ | ○○○ | ○○○ | ○○○ |
| 500 | Yes | Yes | No |
| 501 | No | Yes | Yes |

FIG. 19A

Confidence Score = 50%  ~1920

Standard Company Greeting AutoScore Template Rev 1

| Transaction | AutoScore Answer | Evaluator Answer | AutoScore Answer Changed |
|---|---|---|---|
| 1 | Yes | Yes | No |
| 2 | Yes | No | Yes |
| ○○○ | ○○○ | ○○○ | ○○○ |
| 500 | Yes | Yes | No |
| 501 | No | No | No |

FIG. 19B

Confidence Score = 75%  ~1922

Standard Company Greeting AutoScore Template Rev 2

| Transaction | AutoScore Answer | Evaluator Answer | AutoScore Answer Changed |
|---|---|---|---|
| 1 | Yes | Yes | No |
| 2 | Yes | Yes | No |
| ○○○ | ○○○ | ○○○ | ○○○ |
| 500 | Yes | Yes | No |
| 501 | No | No | No |

FIG. 19C

Confidence Score = 100%  ~1924

ARTIFICIAL INTELLIGENCE BASED REFINEMENT OF AUTOMATIC CONTROL SETTING IN AN OPERATOR INTERFACE USING LOCALIZED TRANSCRIPTS

TECHNICAL FIELD

This disclosure relates generally to evaluation tools for quality assurance. More particularly, embodiments relate to systems and methods for artificial intelligence-based tuning of automatic form filling in an evaluation system.

BACKGROUND

Large organizations often use call centers staffed by a number of call center agents to provide services to customers or other individuals calling the call center. A call center agent must respond to an incoming call courteously and efficiently to satisfy the calling customer's need and the goals of the organization implementing the call center. To promote effective handling of calls by agents, call centers typically include telecommunications equipment programmed to route incoming calls to call center agents having particular skills or expertise. While helping to ensure that calls are handled by agents with the proper skillsets, such mechanisms do not evaluate the interactions between the agents and customers.

An agent interacting with a customer represents the organization to that customer and is responsible for a significant part of the customer experience. Thus, there is great importance in evaluating the agents' performance on a regular basis. To this end, call centers may employ computer-implemented evaluation tools to facilitate evaluating interactions between agents and customers. An evaluator listens to a randomly selected call of a specific agent and fills in an evaluation form via the user interface to attribute to the agent or to the call a quality score or other scores and indications. More particularly, when an evaluator selects a call to evaluate, the evaluator also selects an evaluation form to use. The evaluation tool presents an instance of the evaluation form to the evaluator (e.g., in a web browser-based interface). The evaluator listens to the transaction and answers the questions in the evaluation. When completed, the evaluator or supervisor usually reviews the evaluation with the call center agent.

The process for evaluating agents is often a time-consuming manual process allowing the call center to evaluate only a small sample of interactions. Moreover, evaluations are prone to human error, bias or carelessness. For example, evaluators may not understand performance standards or fail to enforce them consistently. Moreover, evaluations may fail to fully listen to parts of an interaction due to fatigue or other conditions.

SUMMARY

Embodiments relate to systems and methods for artificial intelligence-based tuning of automatic form filling in an evaluation system. When answering questions in an evaluation of a voice session an evaluator can provide an indication of the portion of the session that caused the evaluator to answer the questions the way he or she did. The portions of the sessions corresponding to each possible answer for a question across multiple evaluations can be analyzed to determine words or phrases used in the sessions that correlate to evaluators answering the question a particular way. The words or phrases determined to correlate to an answer can be used for subsequent evaluations to automatically answer the question, thus potentially reducing the number of user interactions with the evaluation and, in some cases, allowing the evaluation to be entirely automated.

According to one embodiment, a data processing system for artificial intelligence-based setting of controls in an evaluation interface is provided. The data processing system includes a processor and a data store. The data store stores a plurality of transactions, each of the plurality of transactions comprising a voice session recording of an inbound call recorded by a call center recording system and a transcript of the voice session. The data store further stores a plurality of completed evaluations, each completed evaluation of the plurality of completed evaluations being an evaluation of a corresponding transaction from the plurality of transactions. Each completed evaluation includes an evaluation answer to a question and an indication of a transcript portion associated with the evaluation answer where the transcript portion is a portion of the transcript from the corresponding transaction.

The data processing system of one embodiment further comprises a non-transitory computer-readable medium storing computer-readable instructions executable by the processor for: determining a word or phrase common to a first set of transcript portions associated with the evaluation answer; creating a first set of auto answer parameters that includes the word or phrase; auto answering the question for a set of test transactions from the plurality of transactions to generate an auto answer for each test transaction of the set of test transactions; and based on a determination that the first set of auto answer parameters auto answered the question with a threshold level of accuracy, configuring an evaluation system to use the first set of auto answer parameters to preset an answer control in an evaluation operator interface.

According to another embodiment, a computer program product is provided. The computer-program product comprises a non-transitory computer-readable medium storing computer-readable instructions, including instructions for accessing a data store storing: a plurality of transactions, each of the plurality of transactions comprising a voice session recording of an inbound call recorded by a call center recording system and a transcript of the voice session; and a plurality of completed evaluations. Each completed evaluation is an evaluation of a corresponding transaction from the plurality of transactions and includes an evaluation answer to a question and an indication of a transcript portion associated with the evaluation answer, where the transcript portion is a portion of the transcript from the corresponding transaction.

The computer-readable instructions further comprise instructions for determining a word or phrase common to a first set of transcript portions; creating a first set of auto answer parameters that includes the word or phrase; auto answering the question for a set of test transactions from the plurality of transactions to generate an auto answer for each test transaction of the set of test transactions; and based on a determination that the first set of auto answer parameters auto answered the question with a threshold level of accuracy, configuring an evaluation system to use the first set of auto answer parameters to preset an answer control in an evaluation operator interface.

According to one embodiment, the computer-readable instructions include instructions for: for each test transaction in the set of test transactions, comparing the auto answer determined for the test transaction to the evaluation answer from a completed evaluation corresponding to the test transaction; based on the comparing, determining a confidence for the first set of auto answer parameters; comparing the confidence for the first set of auto answer parameters to a confidence for the prior set of auto answer parameters; and based on a determination that the first set of auto answer parameters are more accurate than the prior set of auto answer parameters, determining that the first set of auto answer parameters auto answered the question with the threshold level of accuracy.

The indication of the transcript portion may have various forms. According to one embodiment, the indication of the transcript portion comprises a temporal location. In such an embodiment, the computer-readable instructions can include, for example, instructions for determining the transcript portion by selecting text from the transcript of the corresponding transaction that is within a defined range of the temporal location. In addition, or in the alternative, the indication of portion of the transcript corresponding to an evaluation answer can be a set of text selected by an evaluator as being the transcript portion associated with the evaluation answer, or other indication of the transcript portion.

The evaluation operator interface can include tools to allow an evaluator to answer questions in the evaluation and indicate the portions of the corresponding transcript that are associated with the answers. According to one embodiment the evaluation operator interface comprises: an answer control to allow an evaluator to provide an evaluation answer to a question; a media player to play a voice session recording, the media player including a control to allow the evaluator to pause the voice session recording; and a transcript viewer to display the transcript corresponding to the voice session. According to one embodiment, the evaluation operator interface is operable to record a temporal location in the voice session recording at which the evaluator pauses the voice session recording when the evaluator inputs an answer to the question. The completed evaluation can be stored, including the answer to the question and the temporal location recorded for the answer. In addition, or in the alternative, the transcript viewer can provide a tool to allow the evaluator to select the portion of the first transcript to associate with the evaluation answer. The completed evaluation can be stored, including the answer to the question and the selected text.

In some cases, the word or phrase determined for an evaluation answer may be used to revise a prior set of auto answer parameters that include a lexicon previously used by the evaluation system to preset the answer control in the evaluation operator interface. According to one embodiment then, the data store further stores the prior set of auto answer parameters. Determining the word or phrase common to the first set of transcript portions associated with the evaluation answer can include determining that the word or phrase is not included in the lexicon of the prior set of auto answer parameters. Creating the first set of auto answer parameters can include revising the prior set of auto answer parameters by updating the lexicon to include the word or phrase.

It may be desirable, in some implementations, to select words or phrases for one answer to a question that does not correlate to another answer to the question. According to one embodiment, determining the word or phrase common to the first set of transcript portions further comprises determining that the word or phrase is not in a second set of transcript portions.

Various techniques can be used to determine words or phrases from a set of transcript portions. According to one embodiment, determining the word or phrase common to the first set of transcript portions comprises comparing word vectors that represent the first set of transcript portions to determine a word or phrase that appears in each vector. As will be appreciated, some search engines index term frequencies. Thus, in one embodiment can include querying a search index for term frequencies of terms in the first set of transcript portions and determining the word or phrase common to the first set of transcript portions based on the term frequencies.

Embodiments described herein provide systems and methods that automatically set answer controls in an evaluation operator interface and automatically tune the parameters for setting the controls so that auto answering becomes increasingly accurate. Thus, embodiments described herein increase the efficiency of using an evaluation operator interface as the need to manually change answers decreases over time.

Furthermore, embodiments herein provide an advantage by providing systems and methods that can automatically and accurately evaluate a large number of transactions based on evaluations of a relatively small number of transactions. Further, the accuracy of automated evaluation can increase over time. Embodiments described herein provide an advantage by providing mechanisms to more accurately tune auto answering by identifying specific portions of transcripts associated with evaluation answers.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7C illustrates an embodiment of a third operator interface page with controls to input question parameters.

FIG. 8 illustrates an embodiment of an operator interface page with controls to input answer template parameters.

FIG. 19A illustrates one embodiment of a confidence score report, FIG. 19B illustrates an embodiment of a revised confidence score report and FIG. 19C illustrates an embodiment of a further revised confidence report.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Figure 1:
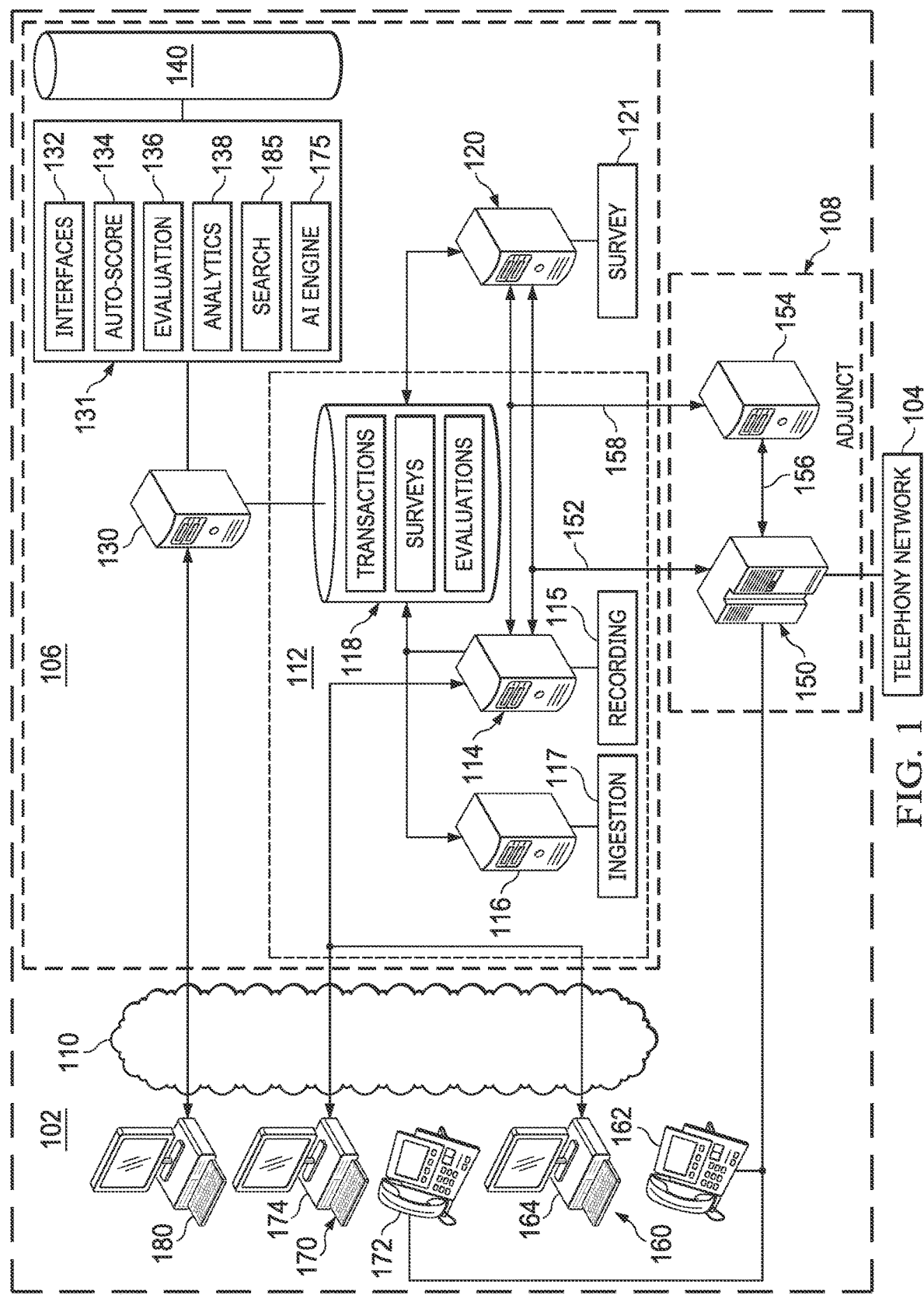
FIG. 1 is a block diagram illustrating one embodiment of a call center system coupled to a telephony network.

FIG. 1 is a block diagram illustrating one embodiment of a call center system 102 coupled to telephony network 104, such as a public switched telephone network (PSTN), VoIP network or other network that can establish call sessions with call center system 102. A call center may receive a large number of calls over network 104 at any given time. These calls are transferred through system 102 and variety of actions can be taken with respect to the calls. Among other functionality, system 102 collects data about the calls, call center or callers during the calls. System 102 stores the audio portion of a call (referred to as a "voice session") in conjunction with data collected for the call.

Call center system 102 comprises a platform 106 coupled to a voice network 108 and a data network 110. Voice network 108 comprises a call routing system 150 to connect incoming calls to terminals in call center system 102 and outgoing calls to telephony network 104. Call routing system 150 may comprise any combination of hardware and/or software operable to route calls. According to one embodiment, call routing system 150 comprises an automatic call distributor (ACD) with interactive voice response (IVR) menus. In addition, or in the alternative, call routing system 150 may include a private branch exchange switch or other call routing hardware or software.

The ACD or other call routing component may perform one or more various functions, such as recognizing and answering incoming calls, determining how to handle a particular call, identifying an appropriate agent and queuing the call, and/or routing the call to an agent when the agent is available. The call routing system 150 may use information about the call, caller or call center or other information gathered by system 102 to determine how to route a call. For example, the call routing system may use the caller's telephone number, automatic number identification (ANI), dialed number identification service (DNIS) information, the caller's responses to voice menus, the time of day, or other information to route a call. The call routing system 150 may communicate with data network 110, a private branch exchange or other network either directly or indirectly, to facilitate handling of incoming calls. The call routing system 150 may also be operable to support computer-telephony integration (CTI).

Call routing system 150 may be coupled to recording server 114 and a survey server 120 of platform 106 by communications lines 152. Lines 152 support a variety of voice channels that allow platform 106 to monitor and record voice sessions conducted over a voice network 108. Call routing system 150 may also be coupled to a voice instrument 162 at agent workstation 160 and a voice instrument 172 at supervisor workstation 170 via a private branch exchange link, VoIP link or other call link. Platform 106 may receive information over lines 152 regarding the operation of call routing system 150 and the handling of calls received by system 102. This information may include call set-up information, traffic statistics, data on individual calls and call types, ANI information, DNIS information, CTI information, or other information that may be used by platform 106.

Voice network 108 can further include adjunct services system 154 coupled to call routing system 150, call recording server 114 and survey server 120 by data links 156, 158. Adjunct services system 154 may comprise a CTI application or platform, contact control server, or other adjunct device accessible by platform 106 to perform call center functions. Adjunct services system 154 may include a link to other components of the call center's management information system (MIS) host for obtaining agent and supervisor names, identification numbers, expected agent schedules, customer information, or any other information relating to the operation of the call center.

Data network 110 may comprise the Internet or other wide area network (WAN), an enterprise intranet or other a local area network (LAN), or other suitable type of link capable of communicating data between platform 106 and computers 164 at agent workstations 160, computers 174 at supervisor workstations 170 and client computers 180 of other types of users. Data network 110 may also facilitate communications between components of platform 106. Although FIG. 1 illustrates one agent workstation 160, one supervisor workstation 170 and one additional client computer 180, it is understood that call center system 102 may include numerous agent workstations 160, supervisor workstations 170 and client computers 180. Computers 164, 174 and 180 may be generally referred to as user client computers.

Platform 106 includes a recording system 112 to record voice sessions and data sessions. In the embodiment illustrated, recording system 112 includes a recording server 114 and an ingestion server 116. Recording server 114 comprises a combination of hardware and/or software (e.g., recording server component 115) operable to implement recording services to acquire voice interactions on VoIP, TDM or other networks, record the voice sessions. Recording server 114 may also be operable to record data sessions for calls. A data session may comprise keyboard entries, screen display and/or draw commands, video processes, web/HTTP activity, e-mail activity, fax activity, applications or any other suitable information or process associated with a client computer. To facilitate recording of data sessions, agent computers 164 or supervisor computers 174 may include software to capture screen interactions related to calls and send the screen interactions to recording server 114. Recording server 114 stores session data for voice and data sessions in transaction data store 118.

Ingestion server 116 comprises a combination of hardware and software (e.g., ingestion server component 117) operable to process voice session recordings recorded by recording server 114 or live calls and perform speech-to-text transcription to convert live or recorded calls to text transcripts. Ingestion server 116 stores the transcription of a voice session in association with the voice session in data store 118. In some embodiments, the voice session is split between channels (e.g., agent channel, incoming caller channel) such that ingestion server 116 generates a transcript for each channel. Each transcript can include time labels such that text in a transcript can be synchronized with the recording of the voice session during playback.

Platform 106 further comprises survey server 120. Survey server 120 comprises a combination of hardware and software (e.g., survey component 121) operable to provide post-call surveys to callers calling into call center system 102. For example, survey server 120 can be configured to provide automated interactive voice response (IVR) surveys. Call routing system 150 can route calls directly to survey server 120, transfer calls from agents to survey server 120 or transfer calls from survey server 120 to agents. Survey data for completed surveys can be stored in data store 118.

Platform 106 may include an evaluation feature that allows an evaluator to evaluate an agent's performance or the agent to evaluate to evaluate his or her own performance. An evaluation may be performed based on a review of a recording. Thus, an evaluation score may be linked to a recording in data store 118. Data store 118 may also store completed evaluations.

In operation, call routing system 150 initiates a session at call center system 102 in response to receiving a call from telephony network 104. Call routing system 150 implements rules to route calls to agent voice instruments 162, supervisor voice instruments 172, recording server 114 or survey server 120. Depending on the satisfaction of a variety of criteria (e.g., scheduling criteria or other rules), routing system 150 may establish a connection using lines 152 to route a call to a voice instrument 162 of an agent workstation 160 and recording server 114. Routing system 150 may also establish a connection for the call to the voice instrument 172 of a supervisor.

Recording server 114 stores data received for a call from adjunct system 154 and routing system 150, such as call set-up information, traffic statistics, call type, ANI information, DNIS information, CTI information, agent information, MIS data. In some cases, recording server 114 may also store a recording of the voice session for a call. Additionally, recording sever 114 may record information received from agent computer 164 or supervisor computer 174 with respect to the call such as screen shots of the screen interactions at the agent computer 164 and field data entered by the agent. For example, platform 106 may allow an agent to tag a call with predefined classifications or enter ad hoc classifications and recording server 114 may store the classifications entered by the agent for a call.

Recording server 114 stores data and voice sessions in data store 118, which may comprise one or more databases, file systems or other data stores, including distributed data stores. Recording server 114 stores a voice session recording as a transaction in data store 118. A transaction may comprise transaction metadata and associated session data. For example, when recording server 114 records a voice session, recording server 114 can associate the recording with a unique transaction id and store a transaction having the transaction id in data store 118. A data session may also be linked to the transaction id. Thus, the transaction may further include a recording of a data session associated with the call, such as a series of screen shots captured from the agent computer 164 during a voice session. The transaction may also include a transcript of the voice session recording created by ingestion server 116. In some embodiments, the voice session may be recorded as separate recordings of the agent and caller and thus, a transaction may include an agent recording, a customer recording, a transcript of the recording of the agent (agent transcript) and a transcript of the recording of the customer (inbound caller transcript). Each transcript can include time labels such that text in a transcript can be synchronized with the recording of the voice session during playback. According to one embodiment, the voice session recording, transcript of the voice session or data session recording for a call may be stored in a file system and the transaction metadata stored in a database with pointers to the associated files for the transaction.

Transaction metadata can include a wide variety of metadata stored by recording server 114 or other components. Transaction metadata may include, for example metadata provided to recording server 114 by routing system 150 or adjunct system 154, such as call set-up information, traffic statistics, call type, ANI information, DNIS information, CTI information, agent information, MIS data or other data. For example, the transaction metadata for a call may include call direction, line on which the call was recorded, ANI digits associated with the call, DNSI digits associated with the call, extension of the agent who handled the call, team that handled the call (e.g., product support, finance), whether the call had linked calls, name of agent who handled the call, agent team or other data. The transaction metadata may further include data received from agent computers 164, supervisor computers 174, or other components, such as classifications (pre-defined or ad hoc tag names) assigned to the call by a member, classification descriptions (descriptions of predefined or ad hoc tags assigned by a call center member to a call) other transaction metadata. The transaction metadata may further include call statistics collected by recording server 114, such as the duration of a voice session recording, time voice session was recorded and other call statistics. Furthermore, other components may add to the transaction metadata as transactions are processed. For example, transaction metadata may include scores assigned by intelligent data processing system 130. Transaction metadata may be collected when a call is recorded, as part of an evaluation process, during a survey campaign or at another time. As one of skill in the art will appreciate, the foregoing transaction metadata is provided by way of example and a call center system may store a large variety of transaction metadata.

Intelligent data processing system 130 provides a variety of services such as support for call recording, performance management, real-time agent support, and multichannel interaction analysis. Intelligent data processing system 130 can comprise one or more computer systems with central processing units executing instructions embodied on one or more computer readable media where the instructions are configured to perform at least some of the functionality associated with embodiments of the present invention. These applications may include a data application 131 comprising one or more applications (instructions embodied on a computer readable media) configured to implement one or more interfaces 132 utilized by the data processing system 130 to gather data from or provide data to client computing devices, data stores (e.g., databases or other data stores) or other components. Interfaces 132 may include interfaces to connect to various sources of unstructured information in an enterprise in any format, including audio, video, and text. It will be understood that the particular interface 132 utilized in a given context may depend on the functionality being implemented by data processing system 130, the type of network utilized to communicate with any particular system, the type of data to be obtained or presented, the time interval at which data is obtained from the entities, the types of systems utilized. Thus, these interfaces may include, for example web pages, web services, a data entry or database application to which data can be entered or otherwise accessed by an operator, APIs, libraries or other type of interface which it is desired to utilize in a particular context.

Data application 131 can comprise a set of processing modules to process data obtained by intelligent data processing system 130 (obtained data) or processed data to generate further processed data. In the embodiment of FIG. 1, data application 131 includes an automated scoring module ("autoscore module") 134, an evaluation module 136, an analytics module 138, an artificial intelligence (AI) engine 175 and a search module 185. Autoscore module 134 implements processes to generate automated scores ("autoscores") for transactions 215 in data store 118. Evaluation module 136 implements processes to allow evaluation designers to design evaluations and processes to provide evaluations to evaluators to allow the evaluators to evaluate agents. Analytics module 138 implements processes to analyze the results of evaluations. AI engine 175 uses the results of analytics to tune the autoscore module 134. Search module 185 indexes transcripts of transactions 215 and other data in data store 118. Different combinations of hardware, software, and/or firmware may be provided to enable interconnection between different modules of the system to provide for the obtaining of input information, processing of information and generating outputs. Intelligent data processing system 130 can include a data store 140 that stores various templates, files, tables and any other suitable information to support the services provided by data processing system 130. Data store 140 may include one or more databases, file systems or other data stores, including distributed data stores.

Figure 2:
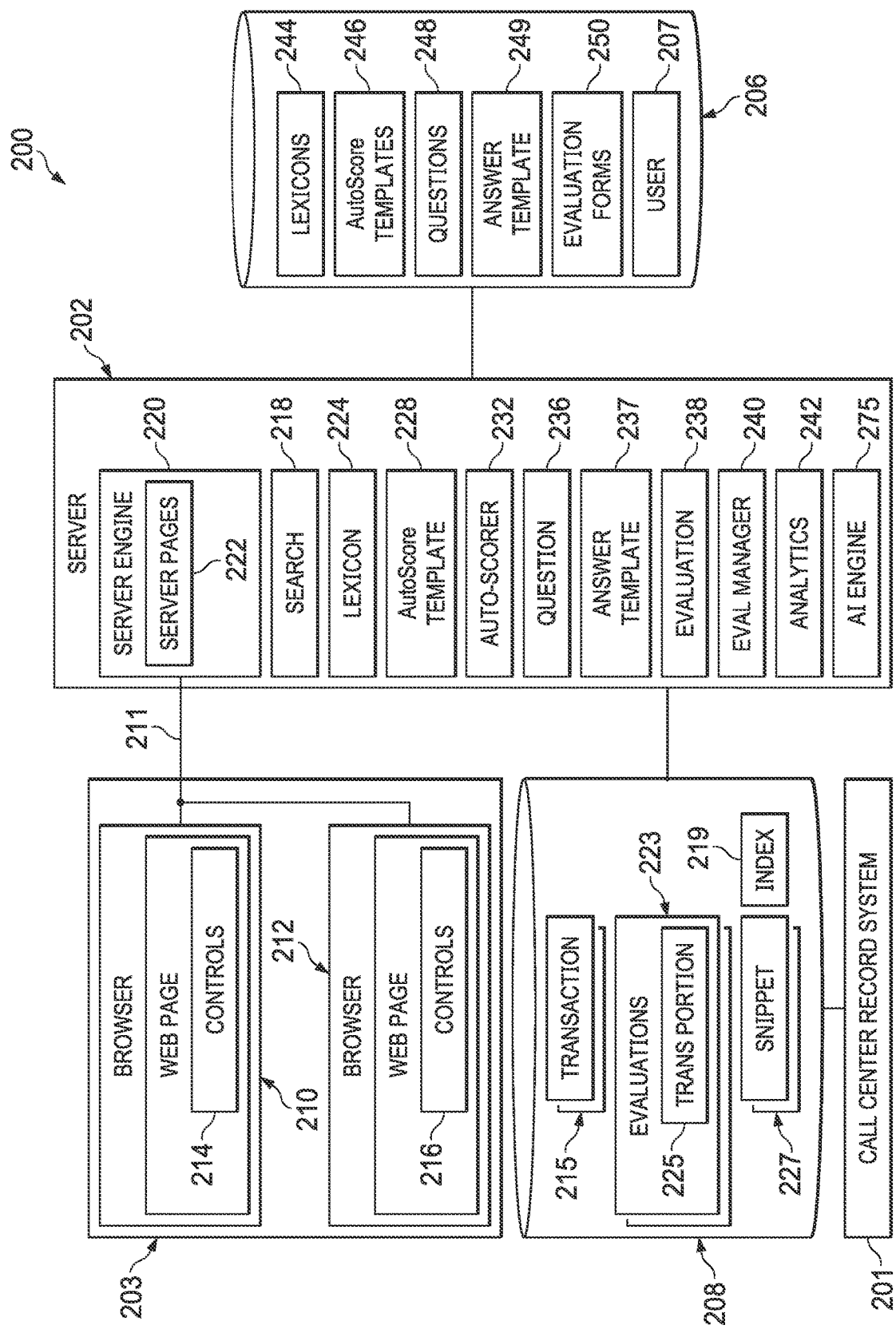
FIG. 2 is a diagrammatic representation of one embodiment of an evaluation system.

FIG. 2 is a diagrammatic representation of one embodiment of an evaluation system 200 operable to access transactions 215 from a call center call recording system 201, such as recording system 112, and provide tools to evaluate the transactions 215. Call center recording system 201 may be any suitable recording system that records and transcribes calls between agents and incoming callers. Evaluation system 200 can be configured to automatically answer questions in evaluations using sets of auto answer parameters. According one embodiment, a set of auto answer parameters includes a lexicon 244 and a set of parameters that control how evaluation system 200 answers an associated question 248 using the lexicon 244. According to one embodiment, auto answer parameters associated with a question 248 are defined in an autoscore template 246, the question 248 or an auto-answer template 249. Evaluation system 200 includes an AI engine 275 that determines or retunes the auto answer parameters used to auto answer questions.

Evaluation system 200 comprises a server tier 202, a client tier 203, a data store 206 and a data store 208. The client tier 203 and server tier 202 can be connected by a network 211. The network 211 may comprise the Internet or other WAN, an enterprise intranet or other LAN, or other suitable type of link capable of communicating data between the client and server platforms. According to one embodiment, server tier 202 and data store 206 may be implemented by intelligent data processing system 130 and data store 140, client tier 203 may be implemented on one or more client computers, such as computers 180, and data store 208 may be an example of data store 118 that stores a set of transactions 215, survey results and completed evaluations 223. Each transaction may comprise transaction 215 metadata, a voice session recording of an inbound call recorded by a call center recording system and a transcript of the voice session. The transaction 215 may further include a data session recording. The transaction metadata for each transaction 215 can comprise an identifier for that transaction 215 and other metadata. Search component 218 provides a search engine that indexes data in data store 206 or data store 208 to create a search index 219, such as an inverted index storing term vectors. More particularly, in one embodiment search component 218 is a search tool configured to index transcripts of transactions 215 and indicated portions thereof in data store 208.

Server tier 202 comprises a combination of hardware and software to implement platform services components that include, for example, search component 218, sever engine 220, server-side lexicon component 224, server-side autoscore template component 228, server-side autoscore processor ("auto scorer") 232, server-side question component 236, server-side answer template component 237, server-side evaluation component 238, evaluation manager 240, server-side analytics component 242 and an artificial intelligence (AI) engine 275. According to one embodiment, lexicons, autoscore templates, questions, answer templates, and evaluation forms may be implemented as objects (e.g., lexicon objects, template objects, question objects, answer template objects, evaluation form objects) that contain data and implement stored procedures. Thus, lexicon component 224 may comprise lexicon objects, server-side autoscore template component 228 may comprise autoscore template objects, server-side question component 236 may comprise question objects, answer template component 237 may comprise answer template objects and server-side evaluation component 238 may comprise evaluation form objects.

Data store 206 may comprise one or more databases, file systems or other data stores, including distributed data stores. Data store 206 may include user data 207 regarding users of a call center platform, such as usernames, roles, teams, permissions and other data about users (e.g., agents, supervisors, designers). Data store 206 may further include data to support services provided by server tier 202, such as lexicons 244, autoscore templates 246, questions 248 and evaluation forms 250. According to one embodiment, lexicons 244 comprise attributes of lexicon objects, autoscore templates 246 comprise attributes of autoscore template objects, questions 248 comprise attributes of question objects, answer templates 249 comprise attributes of answer template objects, and evaluation forms 250 comprise attributes of evaluation objects.

Client tier 203 comprises a combination of hardware and software to implement designer operator interfaces 210 for configuring lexicons, autoscore templates, questions, answer templates, evaluation forms and autoscore tuning parameters and evaluation operator interfaces 212 for evaluating transactions 215. Designer operator interfaces 210 include controls 214 that allow designers to define lexicons, autoscore templates, questions, answer templates or evaluation forms and configure autoscore tuning. Evaluation operator interfaces 212 comprise controls 216 that allow users to evaluate recordings of interactions.

According to one embodiment, designer operator interfaces 210 and evaluation operator interfaces 212 comprise one or more web pages that include scripts to provide controls 214 and controls 216 and server tier 202 comprises a server engine 220 configured with server pages 222 that include server-side scripting and components. The server-side pages 222 are executable to deliver application pages to client tier 203 and process data received from client tier 203. The server-side pages 222 may interface with server-side lexicon component 224, autoscore template component 228, question component 236, answer template component 237, evaluation component 238, evaluation manager 240, and analytics component 242.

Figure 3:
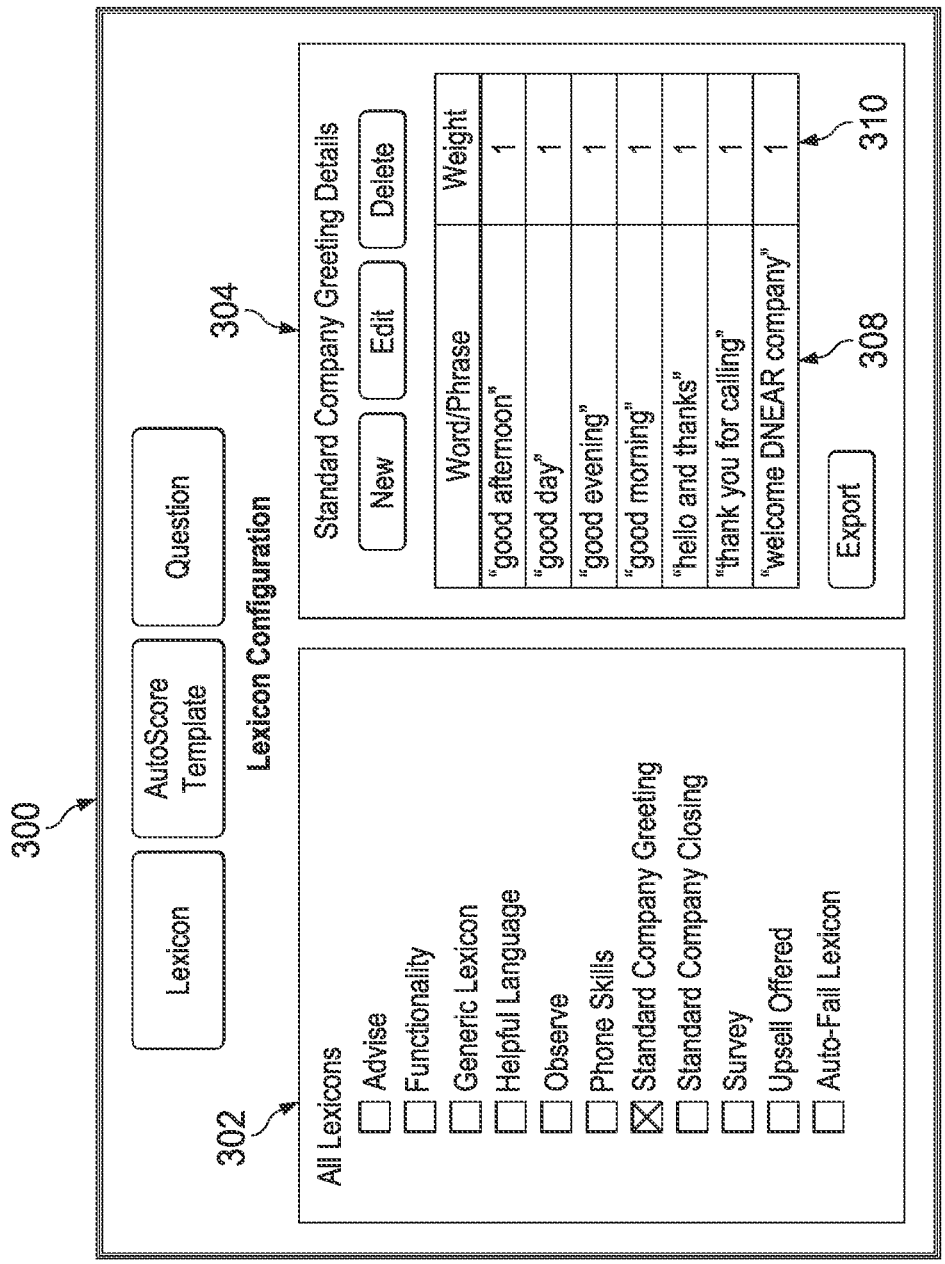
FIG. 3 illustrates one embodiment of an operator interface page with controls to allow a user to create a lexicon.

Evaluation system 200 provides mechanisms to autoscore agent interactions and auto answer questions in evaluations. Autoscoring and auto answering an evaluation question are based, at least in part, on lexicons associated with the question. Evaluation system 200 supports user-defined lexicons and AI-based lexicons. Server engine 220 and lexicon component 224 cooperate to provide a designer operator interface 210 that allows a user to create new lexicons 244 or perform operations on existing lexicons 244. FIG. 3, for example, illustrates an example of a designer operator interface page 300 with controls to allow a designer to define a new lexicon, edit an existing lexicon or delete a lexicon. Interface page 300 presents a list of existing lexicons 302 that allows a user to select a lexicon to edit or delete and a lexicon configuration tool 304 that allows the user to create a new lexicon, edit an existing lexicon or delete an existing lexicon. If a user selects to create a new lexicon, lexicon component 224 can assign the new lexicon a unique identifier to identify the lexicon in data store 206. The designer assigns the lexicon a name for ease of searching.

For a lexicon, the designer can specify lexicon parameters, such as a name, description and a set of lexicon entries. Each lexicon entry includes words or phrases 308 that evaluation system 200 applies to a recording of an agent interaction to determine if the agent interaction contains the word or phrases. A lexicon entry may include search operators, such as "welcome DNEAR company1" to indicate that the evaluation system should search for any combination of "welcome" and "company1" within a pre-defined word proximity to each other. Thus, a lexicon entry may include a word or phrase or a search expression. Each lexicon entry may also include an associated a lexicon entry weight 310, such as a weight of 0-1. The lexicon entry weights, if provided, are used in autoscoring.

Returning briefly to FIG. 2, server tier 202 may thus receive lexicon data based on interactions with operator interface 210. In addition, or in the alternative, one or more lexicons may be determined or revised by AI engine 275. Lexicons input via operator interface 210 or determined by AI engine 275 are stored as lexicons 244 in data store 206. Lexicons may be stored as records in one or more tables in a database, files in a file system or combination thereof or according to another data storage scheme. Each lexicon 244 can be assigned a unique identifier and comprise a variety of lexicon parameters.

According to one embodiment, autoscoring of transactions 215 uses autoscore templates 246 that incorporate lexicons 244. Server engine 220 and autoscore template component 228 cooperate to provide a designer operator interface 210 that allows a user to create new autoscore templates 246 or perform operations on existing autoscore templates 246 (e.g., edit or delete an existing autoscore template). If a user selects to create a new autoscore template, autoscore template component 228 can assign the new autoscore template a unique identifier to uniquely identify the template in data store 206. Each autoscore template 246 can comprise a variety of autoscore template data.

Figure 4:
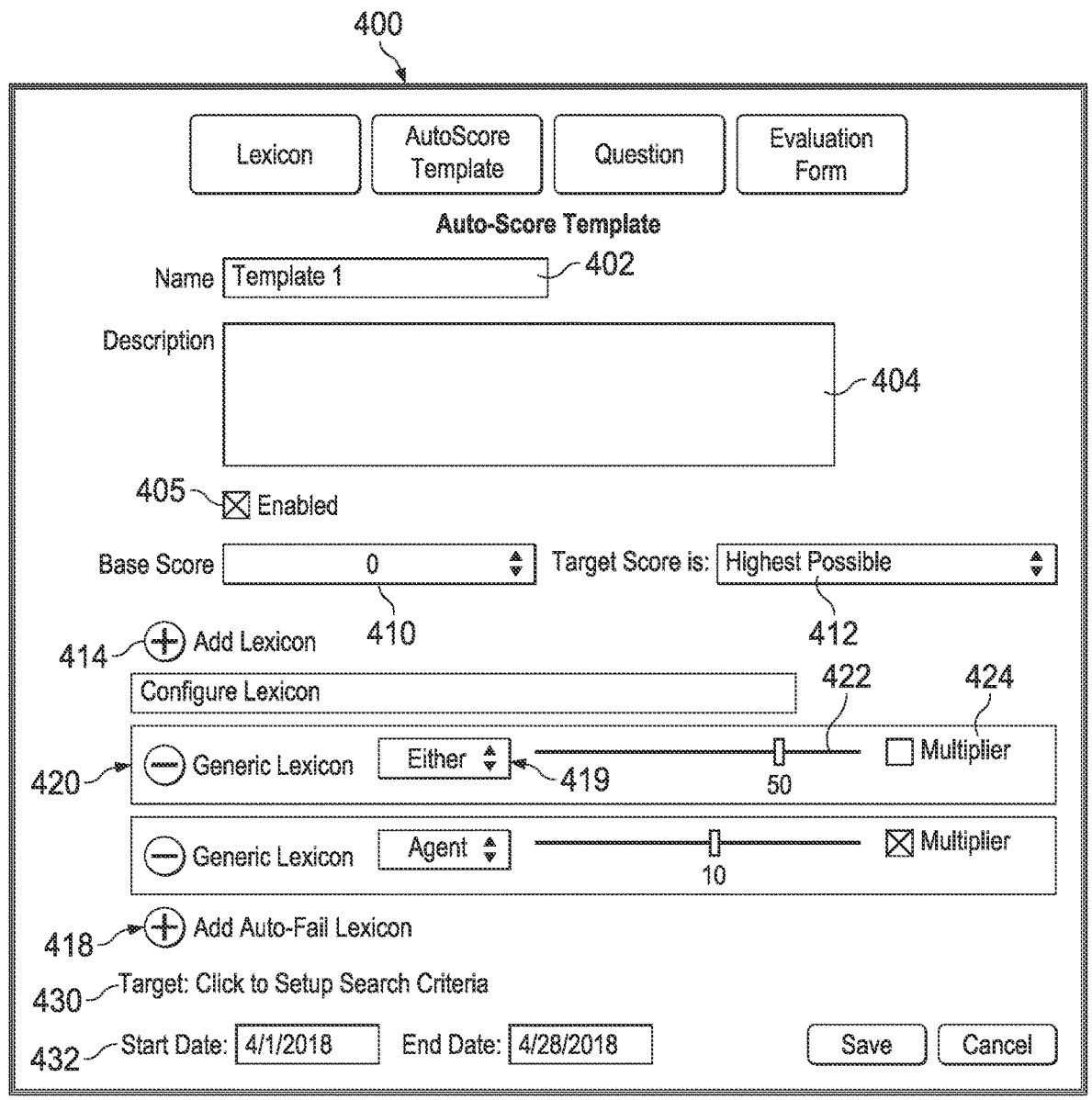
FIG. 4 illustrates an example of an operator interface page with controls to input parameters of an automated scoring template.
Figure 5:
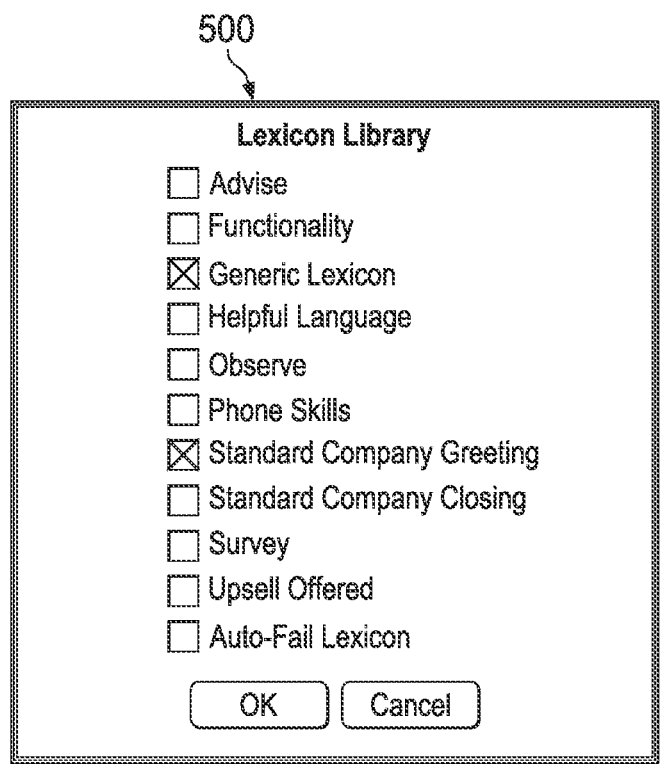
FIG. 5 illustrates an example of an operator interface page with controls to associate a lexicon with an automated scoring template.
Figure 6:
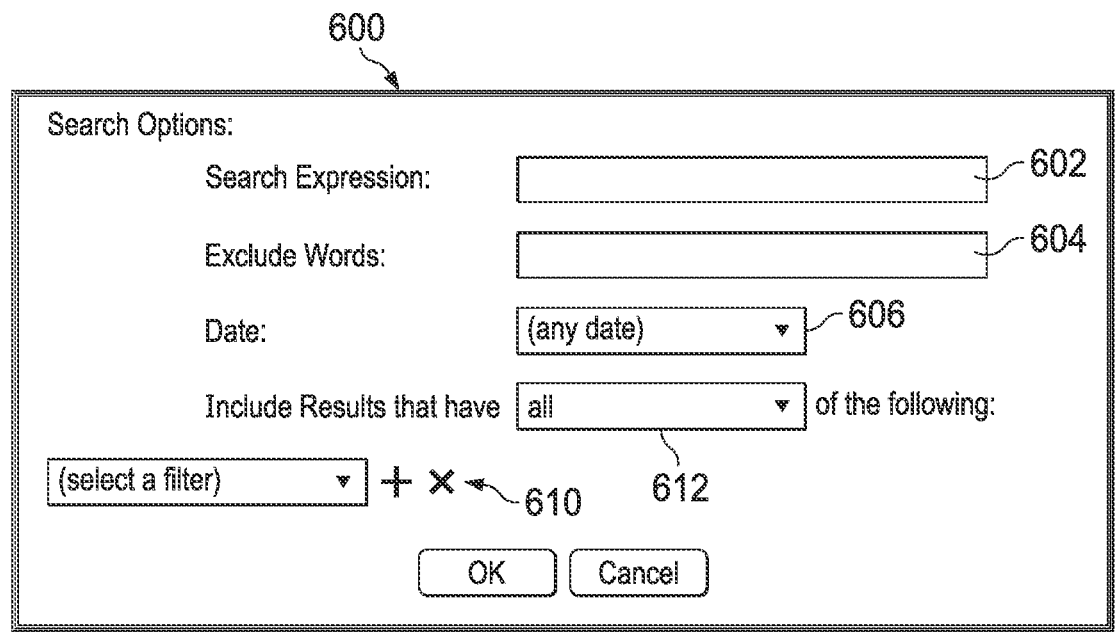
FIG. 6 illustrates an embodiment of an operator interface page with controls to input search criteria for an automated scoring template.

FIG. 4, FIG. 5 and FIG. 6 illustrate example embodiments of operator interface pages with controls to specify template parameters for an autoscore template. In the embodiment illustrated in FIG. 4, the operator interface page 400 provides controls 402 and 404 to allow the user to provide a template name and brief description for ease of searching. Enable control 405 allows the user to specify that the template is available to be processed by auto scorer 232.

An autoscore template can include a lexicon and scoring parameters. To this end, operator interface page 400 includes controls that allow a user to associate lexicons with the autoscore template, specify gross scoring parameters and specify lexicon specific scoring parameters. Operator interface page 400 includes gross scoring controls that allow the user to specify scoring parameters that are not lexicon specific. In FIG. 4, gross scoring controls include base score control 410 and target score control 412. Base score control 410 allows the designer to input the score that will be assigned according to the template if no scores are added or subtracted based on the application of lexicons. Points based on the application of lexicons associated with the autoscore template are added or subtracted from this score when the template is applied. A target score control 412 allows the user to select a final score calculation algorithm from a plurality of predefined final score calculation algorithms to be applied when the autoscore template is applied to an interaction. For example, the evaluation system 200 may support multiple calculation methods, such as:

Highest possible: The score for the associated lexicon with the highest score is added to the base score. Results for other lexicons are ignored.

Lowest possible. The score for the associated lexicon with the lowest score is added to the base. Results for other lexicons are ignored.

Cumulative scoring. The scores for all associated lexicons are added to the base score.

When only one associated lexicon is used in the template, the target scoring setting may have no effect on the final score.

The operator interface page 400 further includes controls 414 and 418 to allow the user to associate one or more lexicons of lexicons 244 with the autoscore template. For example, by clicking on "Add Lexicon" or "Add Auto-Fail Lexicon," the user can be presented with an operation interface 210 that provides controls to allow the user to select lexicons from the library of lexicons 244 to add to the autoscore template. FIG. 5, for example, illustrates one embodiment of an operator interface page 500 having controls that allow the user to select which lexicons from lexicons 244 to associate with the autoscore template.

Returning to FIG. 4, the operator interface page 400 shows that, in this example, the autoscore template is linked to the lexicons "Generic Lexicon" and "Standard Company Greeting" selected via operator interface page 500 and includes lexicon specific controls 420 to set lexicon specific scoring parameters for each lexicon associated with the autoscore template. The lexicon specific controls include lexicon channel controls and lexicon weight controls. The lexicon channel control 419, for example, allows the user to select the channel to which the associated lexicon will apply—that is, whether the associated lexicon is to be applied to the agent channel, incoming caller channel, or both ("either") when the autoscore template is executed. Further, controls 422 and 424 can be used to set additional lexicon scoring parameters. Control 422, for example, provides a slider control to set the lexicon weight value for the "Generic Lexicon" for "Template 1". The weight value may be positive or negative, for example plus or minus 100 points, and indicates how many points are to be assigned if the specified channel of a transaction to which the autoscore template is applied matches the lexicon.

When the template is applied by auto scorer 232, point values for the template begin with the specified base score (e.g., specified using base score control 410) and then points are added or deducted based on behavior that matches each specified lexicon and the lexicon weight value specified for the lexicon in the autoscore template. The autoscore template can be configured so that different point values are added to or subtracted from the base score by selecting a positive or negative lexicon weight. Multiplier control 424 allows the user to specify how points for the specific lexicon are applied when the auto-template is used to evaluate a transaction. If the multiplier is enabled the designated number of points defined by the lexicon weight value are added to or subtracted from the base score each time behavior, defined by the lexicon, is exhibited by the specified speaker. If the multiplier is not enabled, the number of points defined by the lexicon weight value is added to or subtracted from the base score only the first time the speaker is specified by control 419 for the lexicon matches the lexicon.

In the illustrated example, a transaction to which the autoscore template is applied will be awarded fifty points if either the agent or incoming caller transcript matches any of the entries in the "Generic Lexicon" regardless of how many entries in Generic Lexicon the transaction transcripts match. On the other hand, the transaction is awarded 10 points for every entry in "Standard Company Greeting" that the agent transcript matches. As there are seven entries in the "Standard Company Greeting" lexicon according to the example of FIG. 3, a transaction can be awarded up to seventy points based on the "Standard Company Greeting" lexicon according to the autoscore template of FIG. 4. In another embodiment, when the multiplier is enabled for a lexicon, the transaction is awarded points for every instance in the recording that matches any entry in the "Standard Company Greeting." Thus, if the agent said, "thank you for calling" a number of times, the transaction could be awarded ten points for each instance of "thank you for calling."

Further, in some embodiments, the points awarded for matching an entry in a lexicon may be further weighted by the entry weight for that entry (e.g., as specified by weights 310). In any event, the evaluation system may limit the final score that a transaction can be awarded to a particular range, such as 0-100.

Using control 418, the user may designate an auto-fail lexicon for the template. If, in a transaction to which the autoscore template is applied, the transcript for the channel specified for the auto-fail template uses words that match the specified auto-fail lexicon, the final score for the transaction for the template can be zero, regardless of other lexicon scores awarded by the template.

Target control 430 allows the user to specify the transactions to which the template will be applied. In this case, when the user clicks on the text of target control 430, the evaluation system 200 presents an operator interface page that displays a search options interface, one example of which is illustrated in FIG. 6.

Turning briefly to FIG. 6, FIG. 6 illustrates one embodiment of an operator interface page 600 used to specify the transactions to which the autoscore template will apply. More particularly, interface page 600 allows the user to specify search criteria that auto scorer 232 applies to determine the transactions to which to apply the associated autoscore template. In the embodiment illustrated, operator interface page 600 includes search expression control 602 that allows the user to provide search expressions for searching transactions. According to one embodiment, only transactions that meet the search expression (or exact words) are returned. Operator interface page 600 further includes exclude words control 604 that allows the user to specify that transactions that include the words provided should be excluded. In one embodiment, the user may select a lexicon from a drop-down menu so that transactions that include words in the selected lexicon are excluded. Date control 606 allows the user to input a date range for calls to be included. Additional filter options controls 610 allow the user to input additional filter options for selecting transactions to which the autoscore template applies. For example, if the call center classifies transactions by type, such as "sales calls" or "service calls," the user can specify that only transactions corresponding to sales calls should be included. Control 612 allows the user to specify whether a transaction can meet "any" of the additional filter criteria or must meet "all" of the additional filter criteria to be included in the results to which the template applies.

Returning to FIG. 4, interface page 400 further includes an execution data range control 432 that allows a user to specify the date range during which the template is active. The execution date range controls when auto scorer 232 executes the template.

Returning briefly to FIG. 2, server tier 202 may thus receive autoscore template data via interactions in operator interface 210. An autoscore template configured via operator interface 210 can be persisted as an autoscore template 246 in data store 206. Autoscore templates 246 may be stored as records in one or more tables in a database, files in a file system or combination thereof or according to another data storage scheme. Each autoscore template may be assigned a unique identifier and comprise a variety of autoscore template parameters. In some embodiments, AI engine 275 is configurable to tune the autoscore template parameters, such as lexicon weights, whether the multiplier is enabled, the base score, target score algorithm or other parameters of autoscore templates 246.

In general, evaluation instances (evaluations) are created from evaluation forms that define the questions and other content in the evaluations. A page of the operator interface may allow a user to select to create new questions, edit an existing question 248 or delete an existing question 248. If the user selects to create or edit the question the user may be presented with an operator interface page that allows the user to question parameters for the question.

Figure 7A:
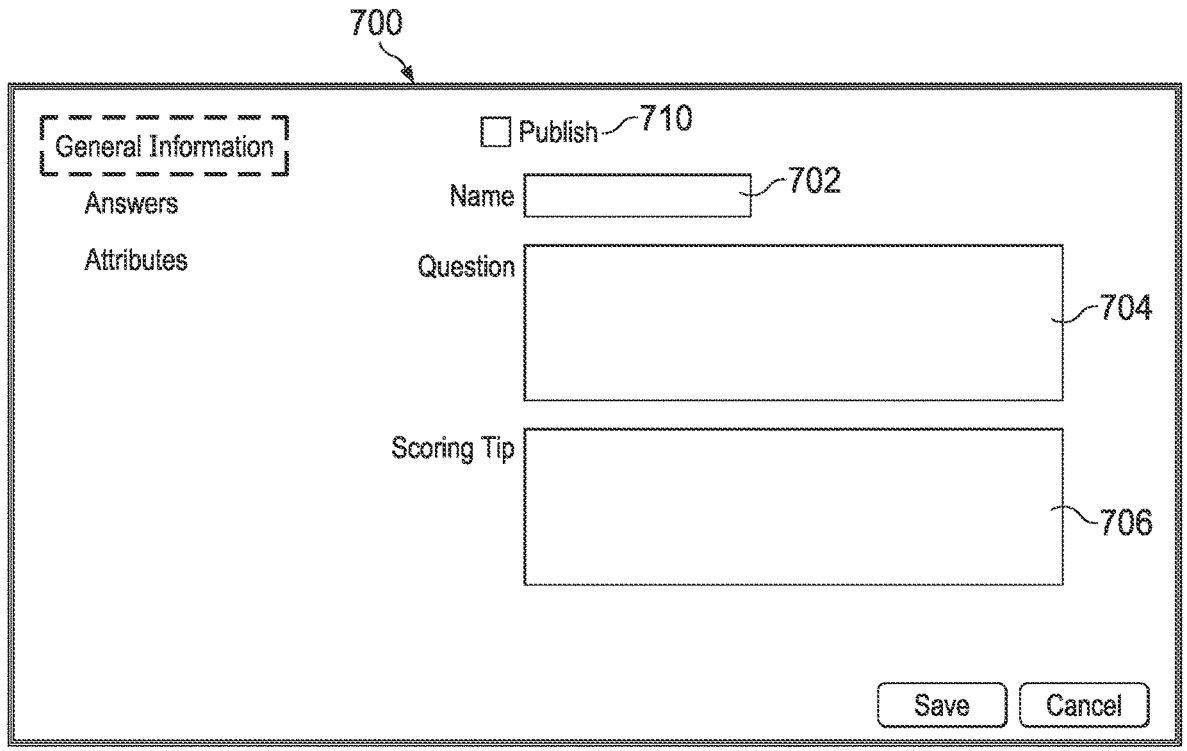
FIG. 7A illustrates an embodiment of an operator interface page with controls to input question parameters.
Figure 7B:
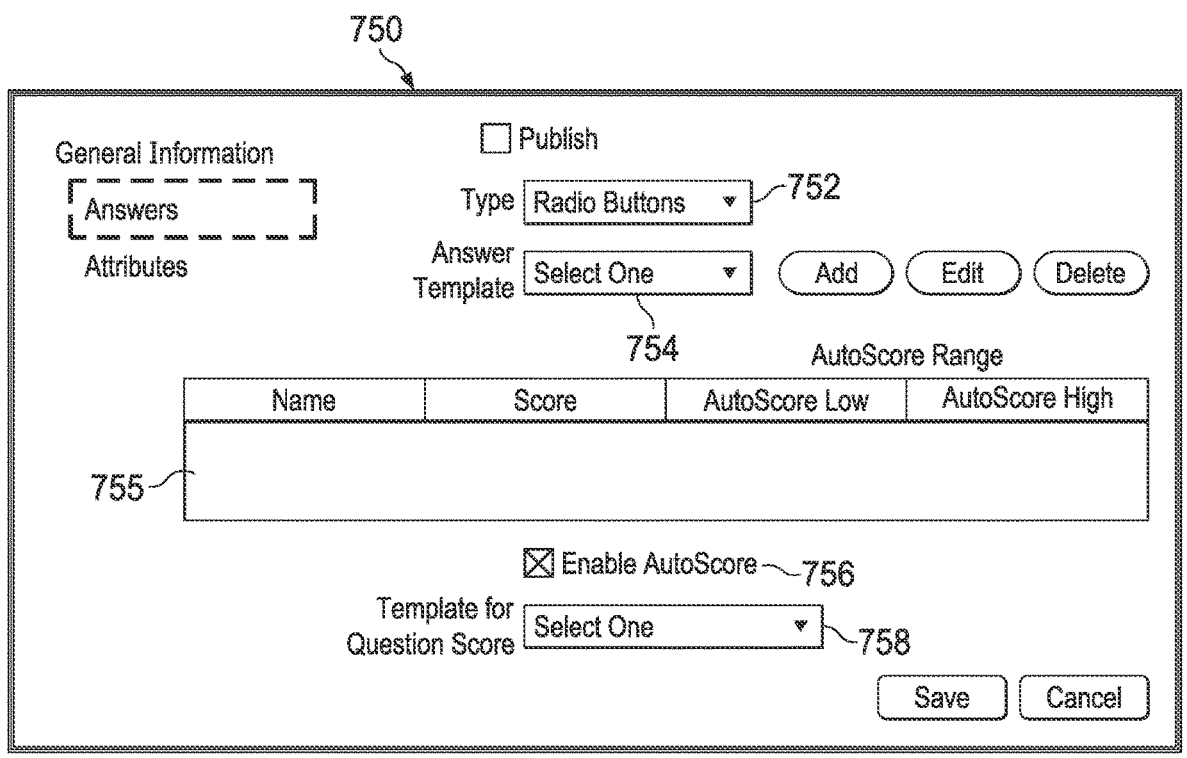
FIG. 7B illustrates an embodiment of a second operator interface page with controls to input question parameters.
Figures 9, 10, 11:
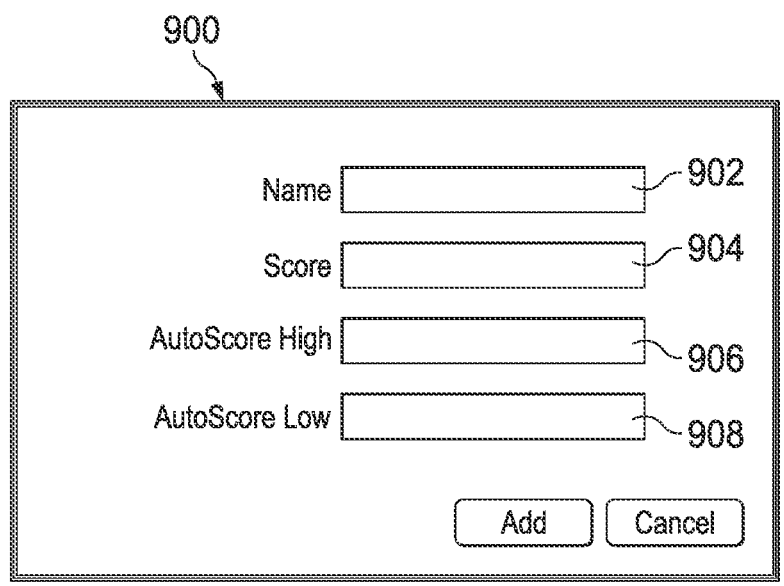
FIG. 9 illustrates an embodiment of an operator interface page with controls to define correspondences between acceptable answers to a question and automated scores.
FIG. 10 illustrates an example of correspondences between acceptable answers to a question and automated scores.
FIG. 11 illustrates another example of correspondences between acceptable answers to a question and automated scores.

Server engine 220, question component 236 and answer template component 237 cooperate to provide an operator interface 210 that allows a user to define questions 248 and answer templates 249. FIG. 7A, FIG. 7B and FIG. 7C, for example, illustrate embodiments of operator interface pages 700, 750, 770 for specifying question parameters and FIG. 8 and FIG. 9 illustrate embodiments of specifying template parameters for an answer template.

Turning to FIG. 7A, interface page 700 includes control 702 to allow the user to name a question, control 704 to allow the user to enter question text and control 706 to allow the user to enter a scoring tip. The question text and scoring tip are incorporated into an evaluation page when an evaluator evaluates a transcript using an evaluation form that incorporates the question. The evaluator scoring tip information provides guidance to the evaluator on how to score the question. Publish control 710 in operator interface page 700 (or operator interface pages 750, 770) allows the user to indicate that the question can be used in an evaluation form.

Operator interface page 750 allows the user to provide answer parameters for the question (question answer parameters) specified in operator interface page 700. Operator interface page 750 includes an answer type control 752 that allows the user to specify what type of control will appear in the evaluation presented to an evaluator. Answer controls are included in the evaluation page based on the answer type selected. Examples of answer controls include, but are not limited to radio buttons, drop down list, edit box and multi-select.

A question may include an answer template. Answer template control 754, for example, allows the user to associate an existing answer template or a new answer template with the question. The user can add, edit or delete a selected answer template (e.g., an answer template selected from answer templates 249). The answer template control 754 may limit the answer templates from which the user may select based on the type selected in control 752.

Operator interface page 750 further includes an autoscore range portion 755 from the selected answer template. Autoscore ranges are discussed further below.

Control 756 allows the user to select whether autoscoring will apply to the question. Control 758 further allows the user to select the autoscore template that the question applies. The user can, for example, select an autoscore template from autoscore templates 246. If the user selects to enable autoscore, then the evaluation system can autoscore transactions 215 for the question based on the specified autoscore template and, for an evaluation that incorporates the question, evaluation system 200 can automatically populate the evaluation with an autoscore auto answer. If the user selects not to use autoscoring, then the acceptable answers and question scores of a selected answer template will apply, but evaluation system 200 will not automatically assign question scores to transactions 215 for the question and will not generate an autoscore auto answer for evaluations that incorporate the question.

FIG. 7C illustrates one embodiment of an operator interface page 770 for specifying additional question settings. Control 772, for example, allows the user to select whether a non-autoscore auto answer applies in cases in which autoscore is not enabled for the question. A non-autoscore auto answer assigns a preset value as an answer for the purpose of saving time for evaluators on question with commonly used answers but does not assign the answer based on autoscoring. Control 774 allows the user to set the preset answer when auto answer is enabled via control 772.

Further the user can set a target answer using control 776. The target answer is the preferred answer to a question and can be used for further evaluation and analysis purposes. The target answer may be selected from the acceptable answers for the question. For example, if a question incorporates the auto-ranges of FIG. 10, the target answer can be selected from "Yes" or "No."

As discussed above, a question may include an answer template by, for example, referencing the answer template. FIG. 8 illustrates one embodiment of an operator interface page 800 for defining an answer template. Answer template settings are applied to each question that includes the template (e.g., as specified using control 754 for the question). Operator interface page 800 provides a control 802 that allows a user to input a name for an answer template and a control 804 that allows a user to input a description of an answer template. Operator interface page 800 further includes an answer type control 806 that allows the user to specify what type of control will appear in the evaluation presented to an evaluator. Examples include, but are not limited to radio buttons, drop down list, edit box and multi-select.

Operator interface page 800 further includes controls 810 to allow a user to add autoscore ranges. If the user selects to add an autoscore range, the user can be presented with an operator interface page that allows the user to input an autoscore range. FIG. 9 is a diagrammatic representation of one embodiment of an operator interface page 900 that allows a user to input an autoscore range. Operator interface page 900 includes a name control 902, a score control 904, an autoscore high value control 906 and an autoscore low value control 908. In the name control 902, the user can enter an acceptable answer that may be selected by an evaluator. In the score control 904, the user can enter a question score for that acceptable answer (the score that will be awarded to a transaction for the question should the evaluator select that answer when evaluating a transaction). Using autoscore high value control 906 and autoscore low value control 908, the user can specify values above and below which the autoscore range is not applied. By specifying an autoscore range for an acceptable answer, the user provides a correspondence between automated scores and acceptable answers to a question.

FIG. 10 provides one example of autoscore ranges for an answer template. In this example, an answer template specifies "Yes" and "No" as the acceptable answers and provides a correspondence between each acceptable answer and a range of autoscores. For the sake of example, it is assumed that the answer template is associated with a yes/no question for which autoscore is enabled and an autoscore template is specified. If an evaluation of a transaction incorporates the yes/no question and the autoscore for the transaction is 95 according to the autoscore template specified for the question, evaluation system 200, when generating the evaluation, can automatically preselect the answer "yes" based on the correspondence between 95 and the acceptable answer "yes" so that the answer is pre-populated when the evaluation is displayed to the evaluator. Otherwise, if the autoscore for the transaction is less than 90, evaluation system 200, automatically preselect the answer "no".

FIG. 11 provides another example of autoscore ranges for an answer template. In the example of FIG. 11, any question using the answer template has five acceptable answers "Excellent," "Exceeds Expectations," "Meets Expectations," "Needs Improvement" and "Poor." If an evaluation of a transaction includes a question to which the answer template applies and the transaction is assigned an autoscore of 81-100 (again assuming autoscore is enabled for the question and an autoscore template is specified), evaluation system 200 will automatically pre-populate the evaluation with the answer "Excellent". Similarly, if the autoscore is 0-20 or 61-80, evaluation system 200 can automatically prepopulate the evaluation with the answers "Poor" or "Exceeds Expectations" accordingly. If the autoscore for the question is 21-60, the evaluation system does not prepopulate an answer to the question unless a non-autoscore auto answer is otherwise specified for the question.

Referring briefly to FIG. 2, server tier 202 may thus receive question data and answer template data via interactions in operator interface 210. A question configured via operator interface 210 can be persisted as question 248 in data store 206 and an answer template configured via operator interface 210 can be persisted as an answer template 249 in data store 206. Questions 248 and answer templates 249 may be stored as records in one or more tables in a database, files in a file system or combination thereof or according to another data storage scheme. Each question 248 can be assigned a unique identifier and comprise a variety of question parameters, including answer parameters for the question. Similarly, each answer template can be assigned a unique identifier and comprise a variety of answer template parameters.

A question 248, associated autoscore template 246, associated answer template 249 and lexicon 244 define auto answer parameters that control how the evaluation system automatically answers an instance of question 248 based on lexicon 244. By way of example, but not limitation, the auto answer parameters include words or phrases, scoring parameters (e.g., lexicon entry weights, gross scoring and lexicon specific scoring parameters), answer parameters for a question, autoscore ranges or other parameters.

Figure 12A:
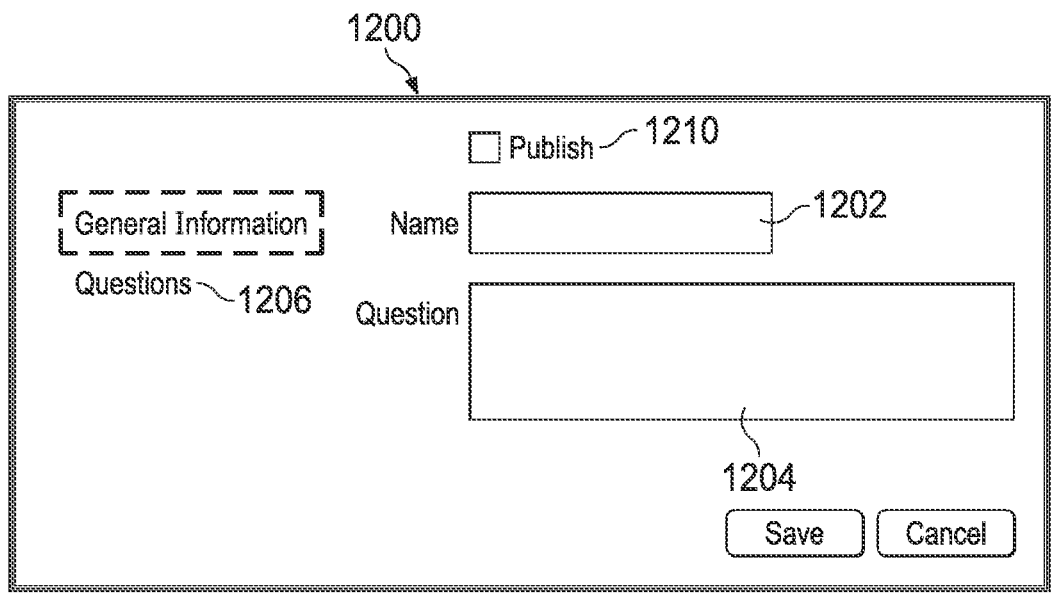
FIG. 12A illustrates an embodiment of an operator interface page with controls to input evaluation form parameters.

Instances of questions 248 may be incorporated in evaluations created from evaluation forms 250. Server engine 220 and evaluation component 238 cooperate to provide an operator interface 210 that allows a user to define evaluation forms 250. FIG. 12A is a diagrammatic representation of one embodiment of an operator interface page 1200 for defining an evaluation form. Form field 1202 allows a user to input an evaluation form name and form field 1204 allows the user to input a description of the evaluation form. Menu item 1206 allows the user to select questions from a library of questions, such as questions 248. Publish control 1210 provides a control that allows the user to indicate that the evaluation system 200 can send evaluations according to the evaluation form to evaluators.

Figure 12B:
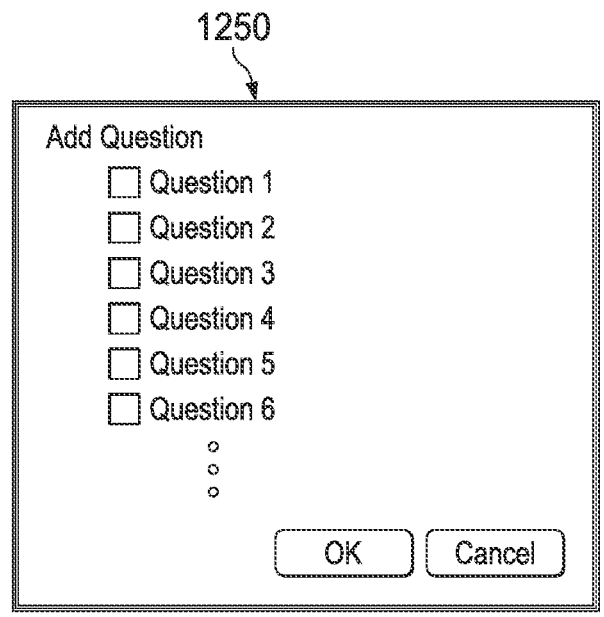
FIG. 12B illustrates an embodiment of an operator interface page with controls to associate questions to an evaluation form.

Responsive to the user selecting to add questions to the evaluation form (e.g., responsive to user interaction with menu item 1206), the user can be presented with a question library interface page 1250 (FIG. 12B) that provides controls to allow the user to select questions from the library of questions 248 to link to the evaluation form. Based on the inputs reviewed via interaction with interface page 1250, the evaluation system associates selected questions from question 248 with the evaluation form.

Returning briefly to FIG. 2, server tier 202 may thus receive evaluation form data based on interactions with operator interface 210. An evaluation form configured via operator interface 210 can be persisted as an evaluation form 250 in data store 206. Evaluation forms 250 may be stored as records in one or more tables in a database, files in a file system or combination thereof or according to another data storage scheme. Each evaluation form 250 can be assigned a unique identifier and comprise a variety of evaluation form data.

Server tier 202 further comprises auto scorer 232 which scores transactions 215 according to autoscore templates 246. According to one embodiment, auto scorer 232 may run as a background process that accesses transactions 215 in data store 208 and autoscores the transactions 215. The autoscores generated by auto scorer 232 may be stored in transaction metadata in data store 208 or elsewhere. In any event, the autoscores can be stored in a manner that links an autoscore generated for a transaction 215 to the autoscore template 246 that was used to generate the autoscore.

Server engine and evaluation manager 240 cooperate to provide evaluations to evaluators based on evaluation forms 250. The evaluations may be displayed, for example, in operator interface 212. Evaluation manager 240 can use pre-generated autoscores (that is, autoscores determined before the evaluation was requested) or autoscores generated in real time when the evaluation is requested to prepopulate answers in the evaluations. One advantage of using pre-generated autoscores is that transactions 215 can be autoscored in batch by auto scorer 232.

More particularly, based on a request for an evaluation to evaluate a transaction 215, the evaluation manager 240 accesses the evaluation form 250, a question 248 included in the evaluation form and an answer template 249 included in the question 248 and determines an autoscore template 246 associated with the question 248. Evaluation manager 240 further accesses the transaction 215 or other record to determine the autoscore assigned to the transaction 215 based on the autoscore template 246. Using the autoscore that was assigned to the transaction 215 based on the autoscore template and the correspondences of autoscores to acceptable answers in the answer template 249, the evaluation system can preselect an acceptable answer to the question. Evaluation manager sets an answer control in the evaluation to the preselected answer and provides the evaluation to the evaluator with the preselected answer.

Figure 13A:
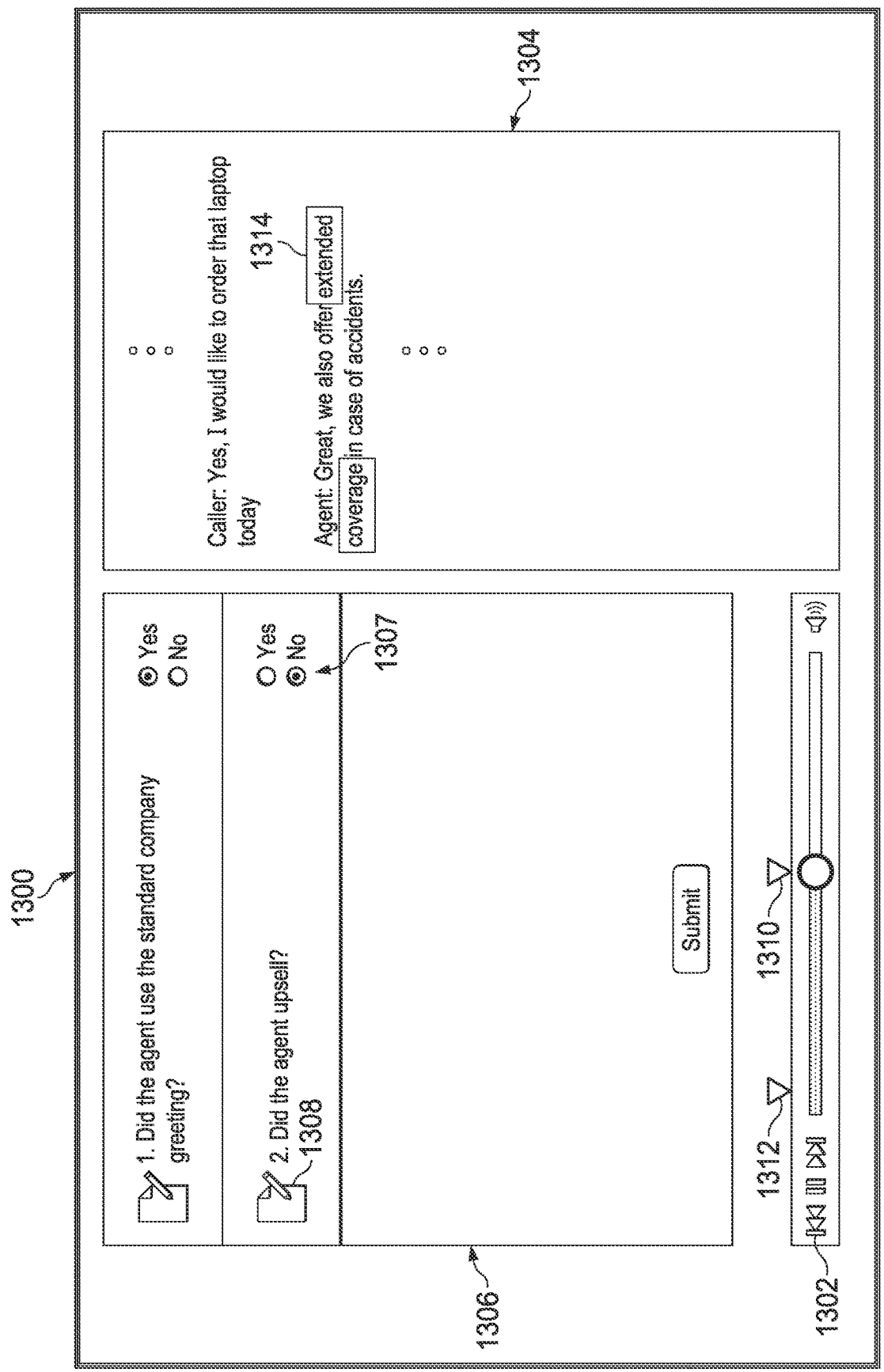
FIG. 13A illustrates an example embodiment of an evaluation operator interface with preselected answers.

FIG. 13A illustrates one embodiment of an evaluation operator interface 1300 including an evaluation for a transaction (e.g., a transaction 215). In the embodiment illustrated, evaluation operator interface 1300 includes a media player 1302, a transcript viewer 1304 and an evaluation portion 1306 displaying one or more questions of an evaluation. Media player 1302 provides controls to allow the evaluator to play the voice session recording for the transaction being evaluated. Transcript viewer 1304 displays the transcription of the voice session recording synchronized with the media player. Evaluation portion 1306 includes answer controls (e.g., answer controls 1307) to allow the evaluator to select an evaluation answer for each displayed question.

Figure 13B:
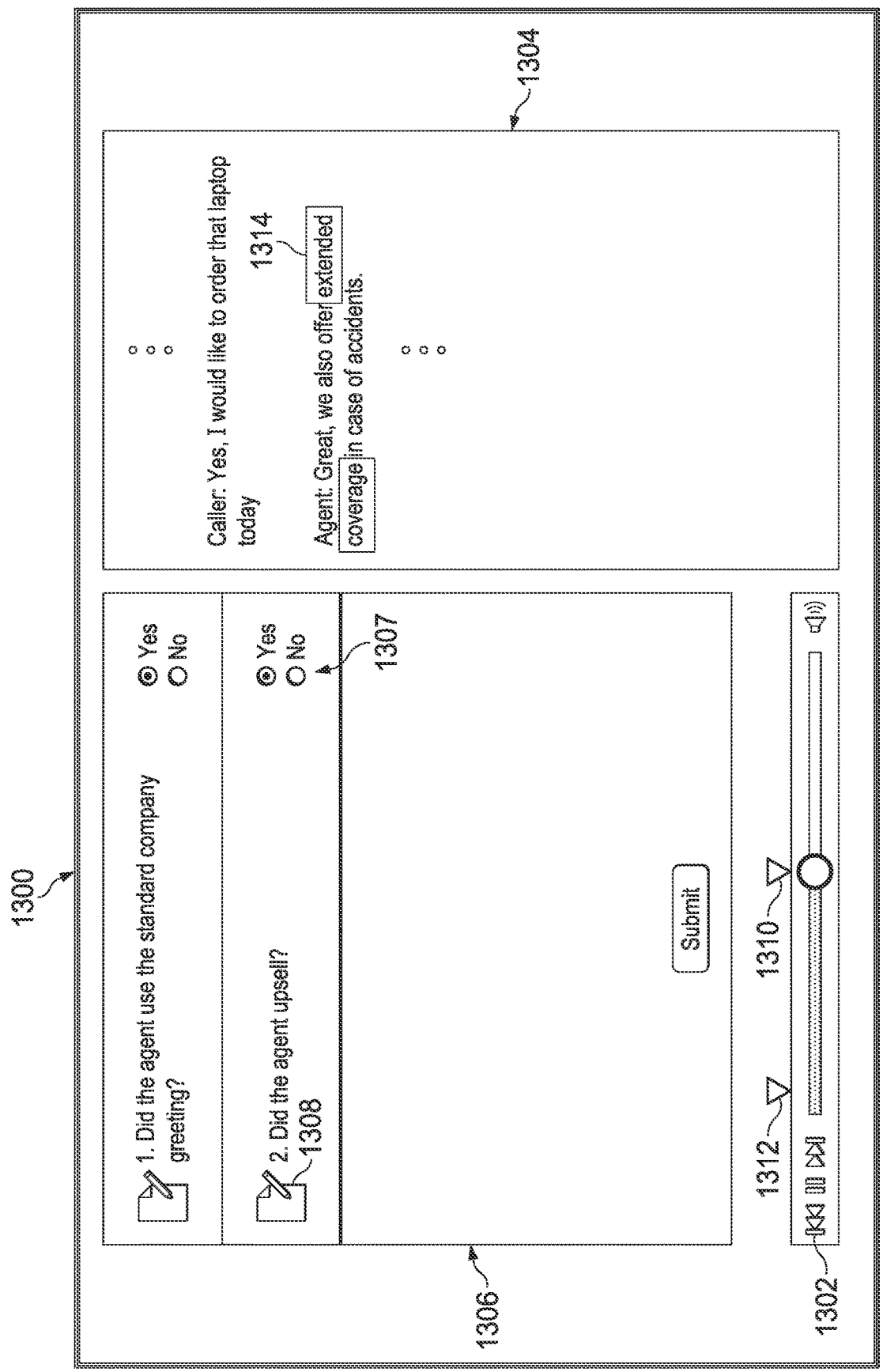
FIG. 13B illustrates an example embodiment of an evaluation operator interface with evaluation answers.

If autoscore is enabled for a question, the answer control for the question is preset using the autoscore that was assigned to the transaction based on the autoscore template and the correspondences of autoscores to acceptable answers to the question in the answer template. For example, in FIG. 13A, the selection of the answer "Yes" can be preset for the question "Did the agent use the standard company greeting?" and the selection of the answer "No" preset for the question "Did the agent upsell?" when the evaluation is sent to the evaluator. These answers are prepopulated based on the autoscores assigned to the transaction by autoscore templates associated with the questions. The evaluator can change the answer from the prepopulated autoscore auto answer. For example, as illustrated in FIG. 13B, the evaluation answer to the question submitted for an evaluation may match the auto answer pre-selected for the evaluation or another answer. In other embodiments, one or more questions in the evaluation are not auto answered.

As the evaluator listens to the voice session and/or reads the transcript, the evaluator is provided with controls to allow the evaluator to indicate the portion of the transcript associated with the evaluation answer. According to one embodiment, the evaluation operator interface is operable to record a temporal location in a voice session recording at which the voice session recording is paused when the evaluator inputs an evaluation answer to a question. For example, in an embodiment in which a single question is presented at a time, the evaluator may pause the recording, select an answer to a question (or keep an auto answer if provided) and click submit to submit an evaluation answer to the question. In such an embodiment, the time at which the recording is paused when the evaluation answer is submitted can serve as an indication of the portion of the transcript associated with the evaluation answer. The evaluator can then be presented with the next question.

In another embodiment, the evaluator may be provided a tool to indicate the question being answered. For example, the evaluator can pause the recording and use a tool to add a time tag for the question. The evaluation operator interface records the temporal location in the voice session recording at which the voice session recording is paused in the tag for the question. For example, in one embodiment, the evaluator can click on a tool icon 1308 to add a tag 1310 to the time bar for question 2 and the evaluation operator interface can record the temporal location at which the recording is paused in the tag for question 2 (a tag 1312 for question 1 is also illustrated). When the evaluator submits the completed evaluation, the tags associated with each question are included. The tags provide the temporal locations selected by the evaluator for the questions, thus indicating the portions of the transcript associated with the evaluation answers to the questions.

In addition, or in the alternative, transcript viewer 1304 can provide a tool to allow the evaluator to directly select a portion of the transcript to associate with an evaluation answer. For example, when the evaluator clicks on tool icon 1308, the transcript viewer 1304 can present a text selection tool that allows the evaluator to highlight or otherwise select text from the transcript (e.g., as indicated by selected text 1314). According to one embodiment, evaluation operator interface 1300 can be operable to create a snippet containing the selected text and associate the snippet with the evaluation answer. When the evaluator submits the completed evaluation, the snippets associated with each question are included. The text selections represent the portions of the transcript associated with the evaluation answers to the questions.

Thus, when the evaluator submits an evaluation answer to a question in an evaluation of a transaction, evaluation operator interface 1300 can also provide an indication of a transcript portion associated with the evaluation answer. In some embodiments, the indication of the transcript portion includes a temporal location at which the transcript portion occurs. In addition, or in the alternative, the indication of transcript portion includes a snippet of text selected by an evaluator as being the transcript portion associated with the evaluation answer. For example, when the evaluator submits the evaluation answers illustrated in FIG. 13B, the evaluation answer "Yes" to question 1 can be associated with the temporal location indicated by tag 1312 and/or a snippet of text and the evaluation answer "Yes" to question 2 can be associated with the temporal location indicated by tag 1310 and/or the snippet of selected text 1314 "extended coverage."

Returning briefly to FIG. 2, data store 208 can thus store completed evaluations 223 of corresponding transactions 215. A completed evaluation 223 includes evaluation answers to questions and an indication of a transcript portion 225 associated with the evaluation answer, where a transcript portion is a portion of the transcript from the corresponding transaction 215 evaluated by the evaluation. The indication of the transcript portion according to one embodiment is a temporal location in the transcript. According to another embodiment, the indication of the transcript portion 225 is a snippet 227 or a reference to a snippet 227 associated with the evaluation answer. A completed evaluation 223 may also include an indication of the auto answer for any question in the evaluation was auto answered, even if the evaluation answer differs from the auto answer.

Figure 14:
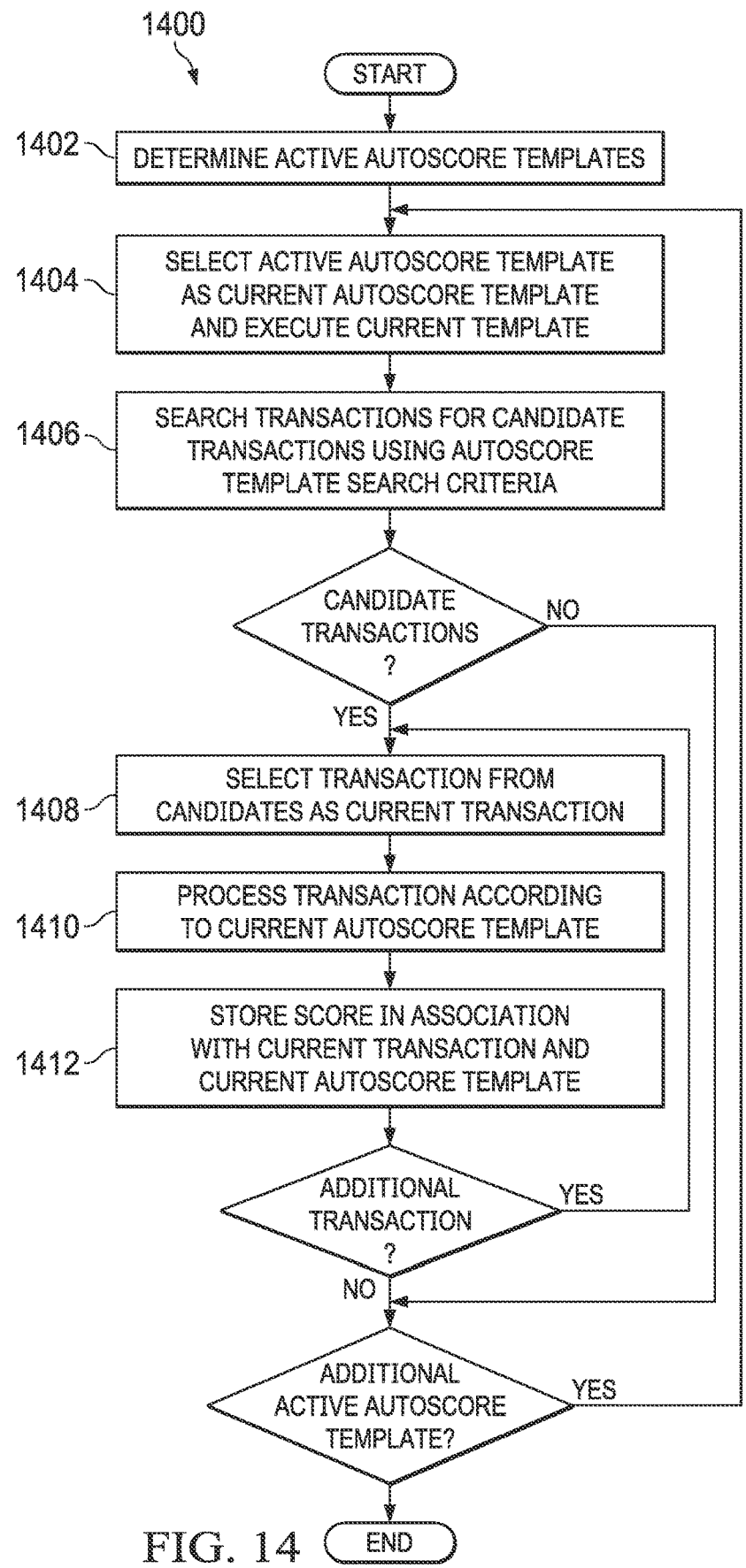
FIG. 14 is a flow chart illustrating one embodiment of a method for autoscoring transactions.

FIG. 14 is a flow chart illustrating one embodiment of a method 1400 for autoscoring transactions (e.g., transactions 215). The steps of FIG. 14 may be implemented by a processor of an evaluation system (e.g., evaluation system 200) that executes instructions stored on a computer readable medium. The processor may be coupled to a data store, such as data store 118, data store 208 or data store 206. In one embodiment, the processor may implement an auto scorer, such as auto scorer 232, to implement method 1400.

The system identifies active autoscore templates from a set of autoscore templates (e.g., autoscore templates 246) (step 1402). For example, the evaluation system may query a data store for templates having an execution start data that is less than or equal to the current date and an execution end date that is greater than equal to the current date. The evaluation system selects an active template as the "current autoscore template", loads the current autoscore template, including any lexicons included in the autoscore template, and executes the current autoscore template (step 1404). For the current autoscore template, evaluation system formulates search queries based on the search criteria in the current autoscore template and searches a data store (e.g., data store 208) for candidate transactions that meet the search criteria of the active autoscore template (step 1406). For example, the evaluation system searches the transactions to determine candidate transactions based on transaction metadata that meets the search criteria. The evaluation system may include, as implicit search criteria for the autoscore template, that the candidate transactions are transactions that have not previously been autoscored based on the current autoscore template. If there are no candidate transactions that meet the search criteria, the evaluation system can move to the next active autoscore template. If there are transactions that meet the search criteria for the current autoscore template, processing can proceed to step 1408 and the evaluation system selects a candidate transaction as the current transaction.

The evaluation system applies the current autoscore template to the current transaction to determine an autoscore associated with the transaction for the autoscore template (step 1410) and stores the autoscore for the autoscore template in association with the current transaction (step 1412). For example, the identity of the autoscore template and the score generated according to the autoscore template for the transaction may be stored as part of the transaction's metadata in a data store 118, 208. In another embodiment, the autoscore generated for the transaction is stored elsewhere in a manner such that the score is linked to both the transaction and the autoscore template that was used to generate the auto score template for the transaction. One embodiment of scoring a transaction according to an autoscore template is described in conjunction with FIG. 15.

As illustrated in FIG. 14, the current autoscore template is applied to each candidate transaction. Furthermore, each active autoscore template is executed for its respective set of candidate transactions. The steps of FIG. 14 are provided by way of example and may be performed in other orders. Moreover, steps may be repeated or omitted, or additional steps added.

Figure 15:
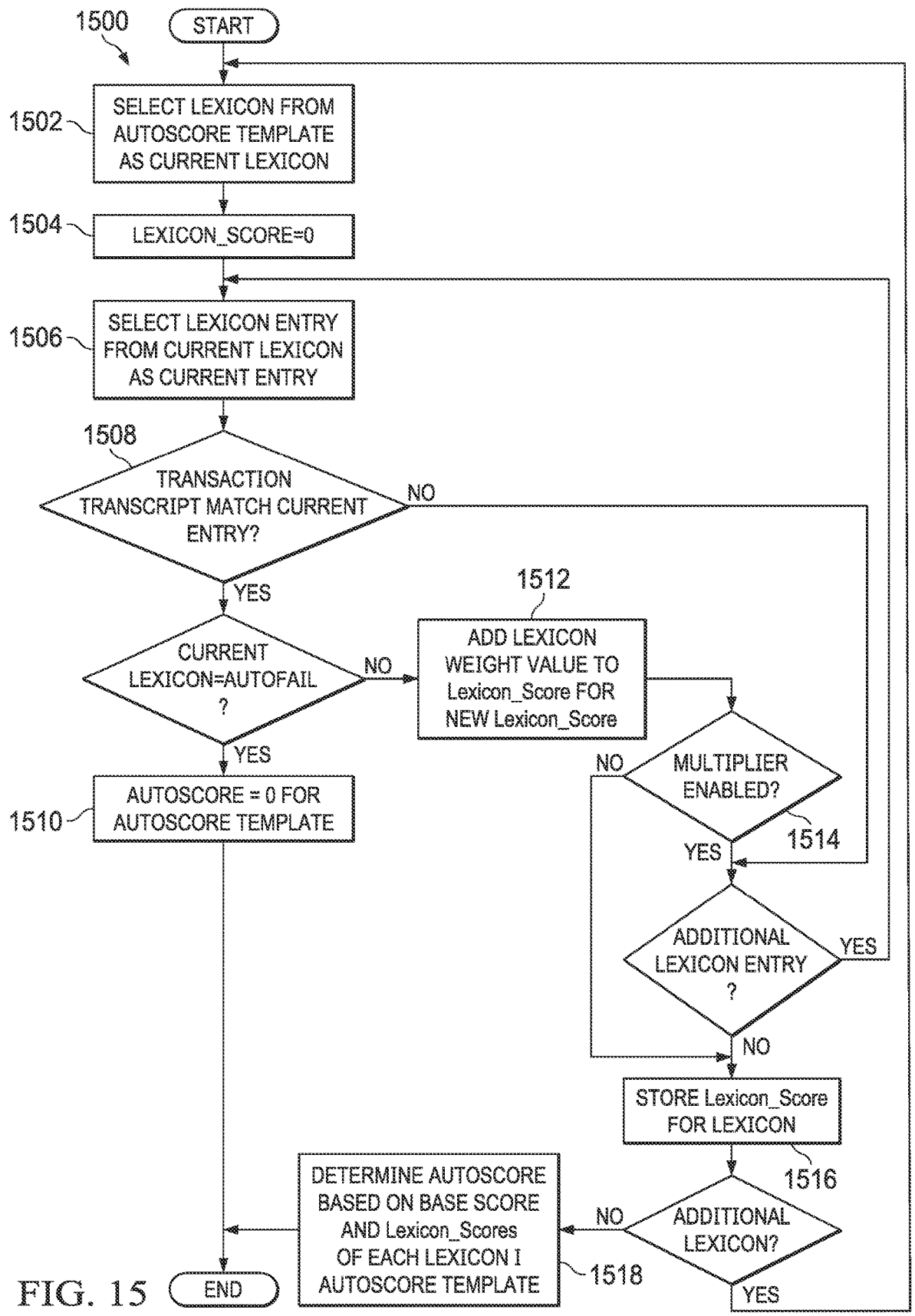
FIG. 15 is a flow chart illustrating one embodiment of a method for autoscoring a current transaction using a current autoscore template.

FIG. 15 is a flow chart illustrating one embodiment of a method 1500 for autoscoring a current transaction using a current autoscore template. According to method 1500, the evaluation system selects a lexicon from the current autoscore template as the current lexicon (step 1502) and sets a score for the current lexicon to 0 (step 1504). The evaluation system selects a lexicon entry from the current lexicon as a current entry (step 1506) and determines if the transaction transcript for the channel specified for the current lexicon in the autoscore template (e.g., via control 419) matches the current lexicon entry (step 1508). For example, the evaluation system searches the transcript for words/phrases that match the words/phrases or search operators specified in the current lexicon entry. If the transcript does not match the lexicon entry, the evaluation system moves to the next lexicon entry.

If a transaction transcript matches the lexicon entry and the current lexicon is designated as an auto fail lexicon for the autoscore template, the evaluation system can output an autoscore of 0 for the transaction for the current autoscore template (step 1510) and move to the next candidate transaction. If the lexicon is not designated as an auto fail lexicon for the autoscore template, the evaluation system can add the lexicon weight value (e.g., as specified via control 422) to the current lexicon score to update the current lexicon score (step 1512). The lexicon weight value may be reduced for the entry if the entry has an entry weight that is less than 1.

If the multiplier is not enabled (e.g., as specified via control 424) (step 1514), the evaluation system stores the lexicon score for the current lexicon, which will equal the lexicon weight value for the current lexicon at this point (step 1516), and moves to the next lexicon in the current autoscore template.

If the multiplier is enabled, the evaluation system can move to the next entry in the lexicon; that is, return to step 1506 and select the next lexicon entry from the current lexicon as the current lexicon entry. Thus, the lexicon score for the current lexicon can increase for each lexicon entry that the transaction transcript matches. When all the lexicon entries in the lexicon have been processed, the evaluation system can store the lexicon score for the current lexicon (step 1516). The evaluation system can apply each lexicon incorporated in the autoscore template and determine a lexicon score for each lexicon.

At step 1518, the evaluation system determines an autoscore for the current transaction and current autoscore template based on the lexicon scores for the lexicons in the current autoscore template, a base score specified in the autoscore template (e.g., as specified via base score control 410) and a target score algorithm selected for the autoscore template. For example, the evaluation system can add the highest lexicon score of the lexicons associated with the autoscore template to the base score, add the lowest lexicon score of the lexicons associated with the autoscore template to the base score, or add the lexicon scores for all the lexicons associated with the autoscore template to the base score. According to one embodiment, the evaluation system may limit the minimum and maximum for the autoscore for the current transaction to a range, such as e.g., 0-100.

In method 1500 with the multiplier enabled, a transaction may be scored once for each lexicon entry in a lexicon that the appropriate transcript of the transaction matches. In another embodiment, the transaction may be scored for every hit over every lexicon entry in the transaction transcript to which the lexicon applies. Using the examples of FIG. 3 and FIG. 4, if the agent said "thank you for calling" a number of times, the lexicon score for the "Company Standard Greeting" lexicon can be increased by ten for each instance of "thank you for calling."

The steps of FIG. 15 are provided by way of example and may be performed in other orders. The steps may be repeated or omitted, or additional steps added.

Figure 16:
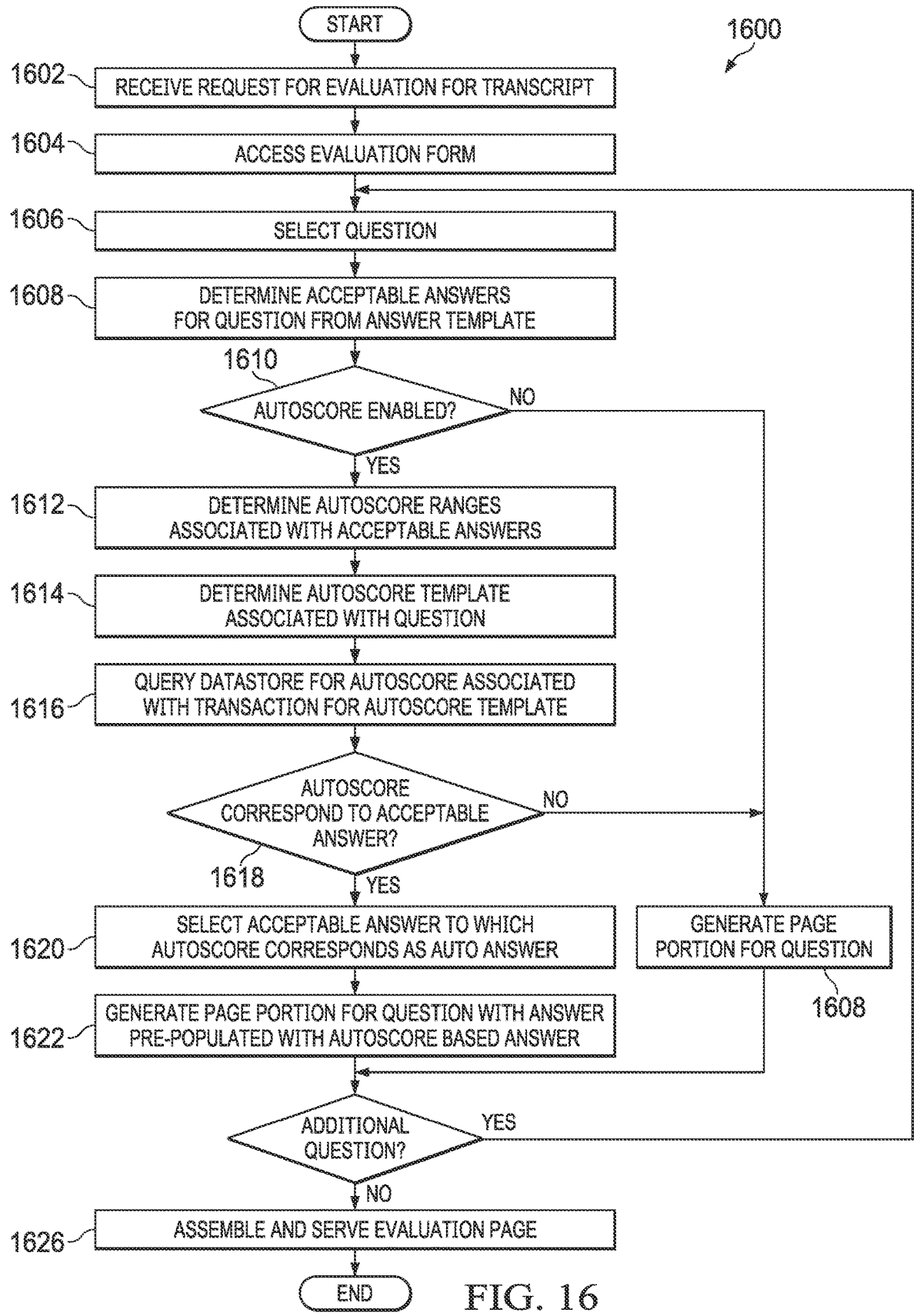
FIG. 16 is a flow chart illustrating one embodiment of a method for generating an evaluation to evaluate a transaction.

FIG. 16 is a flow chart illustrating one embodiment of a method 1600 for generating an evaluation to evaluate a transaction. The steps of FIG. 16 may be implemented by a processor of an evaluation system (e.g., evaluation system 200) that executes instructions stored on a computer readable medium. The processor may be coupled to a data store, such as data store 118, data store 208 or data store 206. The processor may implement an evaluation manager, such as evaluation manager 240 to implement method 1600.

According to one embodiment, the evaluation system receives a request from an evaluator for an evaluation to evaluate a transaction. As discussed above, the transaction may be assigned an automated score according to an automated scoring template based on a transcript of the transaction having matched a lexicon associate with the automated scoring template (step 1602). Responsive to the request, the evaluation system creates the requested evaluation from an evaluation form.

The evaluation system accesses the appropriate evaluation form (step 1604) and selects a question from the evaluation form (step 1606). The evaluation system further determines the acceptable answers to the question (step 1608). For example, the evaluation system may access an answer template included in the selected question to determine the acceptable answers for the selected question.

The evaluation system determines if autoscore is enabled for the question (step 1610) (e.g., as was specified for the question using control 756). If autoscore is not enabled, the evaluation system may generate the page code for the question where the page code includes the question text, scoring tip and answer controls (e.g., drop down list, edit box or multi-select controls) (step 1608). In some cases, an answer may be prepopulated using predefined values that are not based on the autoscores.

If autoscore is enabled for the question, the evaluation system determines the autoscore ranges associated with the acceptable answers. For example, the evaluation system may access an answer template referenced by the question, where the answer template holds the associations between autoscore ranges and acceptable answers for the question (step 1612). Further, the evaluation system determines the autoscore template associated with the question (for example, the autoscore template specified via control 758) (step 1614).

Based on the transaction identification of the transaction to be evaluated and the autoscore template associated with the question, the evaluation system determines the autoscore assigned to the transaction based on the autoscore template associated with the question (step 1616). For example, an autoscore assigned to a transaction and the identity of the autoscore template that generated the autoscore may be stored in the transaction metadata for the transaction. Thus, the evaluation system can determine the autoscore assigned to the transaction based on the autoscore template associated with the question from the metadata of the transaction to be evaluated. In another embodiment, a data store that holds autoscore records that specify autoscores assigned to transactions and the identities of the autoscore templates that generated the autoscores such that the evaluation system can determine the autoscore assigned to the transaction based on the autoscore template by searching the autoscore records.

The evaluation system determines if the autoscore assigned to the transaction based on the autoscore template associated with the question is associated with an acceptable answer to the question. For example, the evaluation system compares the autoscore with the autoscore ranges corresponding to the acceptable answers for the question (step 1618). If the autoscore is not in an autoscore range for an acceptable answer to the question, the evaluation system may generate the page code for the question where the page code includes the question text and answer controls (e.g., drop down list, edit box or multi-select controls) to allow the evaluator to submit an answer (step 1608). In some cases, an answer may be prepopulated using predefined values that are not based on the autoscores (e.g., based on inputs via controls 772, 774).

If the autoscore assigned to the transaction based on the autoscore template associated with the question is associated with an acceptable answer to the question, the evaluation system selects the acceptable answer to which the autoscore corresponds. For example, if the autoscore is in an autoscore range corresponding to an acceptable answer for the question, the evaluation system selects that acceptable answer as the autoscore auto answer for the question (step 1620). The evaluation system generates the page code for the question where the page code includes the question text and answer controls (e.g., drop down list, edit box or multi-select controls) to allow the evaluator to submit an answer (step 1622). In this case, the evaluation system presets the answer controls in the page code for the question to the preselected autoscore auto answer (the answer selected in step 1620) (e.g., sets a radio button to "checked", sets a selected list option value for a dropdown list as selected or otherwise sets the answer control to indicate the preselected answer).

Using the example of FIG. 10 and FIG. 13A, if the transaction was assigned an autoscore of 91 for question 1 and an autoscore of 50 for question 2 based on the autoscore template associated with the questions, the evaluation system can generate page code having a "Yes" radio button and a "No" radio button in the page code with the "Yes" radio button marked as checked in the page code and generate page code having a "Yes" radio button and a "No" radio button for question 2 with the "No" radio marked as checked in the page code. Thus, the appropriate radio buttons are preselected when the evaluator receives evaluation displayed in evaluation portion 1306. As another example that uses the autoscore ranges of FIG. 11, if the transaction was assigned an autoscore of 75 based on the autoscore template referenced in the question, the evaluation system may generate page code with a drop list having the options "Excellent," "Exceeds Expectations," "Meets Expectations" "Needs Improvement" and "Poor," with "Exceeds Expectations" option marked as selected in the page code. Thus, the initial state of a menu, radio button or other answer control in an evaluation may be set to reflect the preselected answer that was selected based on a defined correspondence between the assigned autoscore and the preselected answer. The evaluation system assembles the evaluation page and serves the evaluation to the evaluator (e.g., for display in operator interface 212, evaluation operator interface 1300) (step 1626). The steps of FIG. 16 are provided by way of example and may be performed in other orders. Moreover, steps may be repeated or omitted, or additional steps added.

Figure 17:
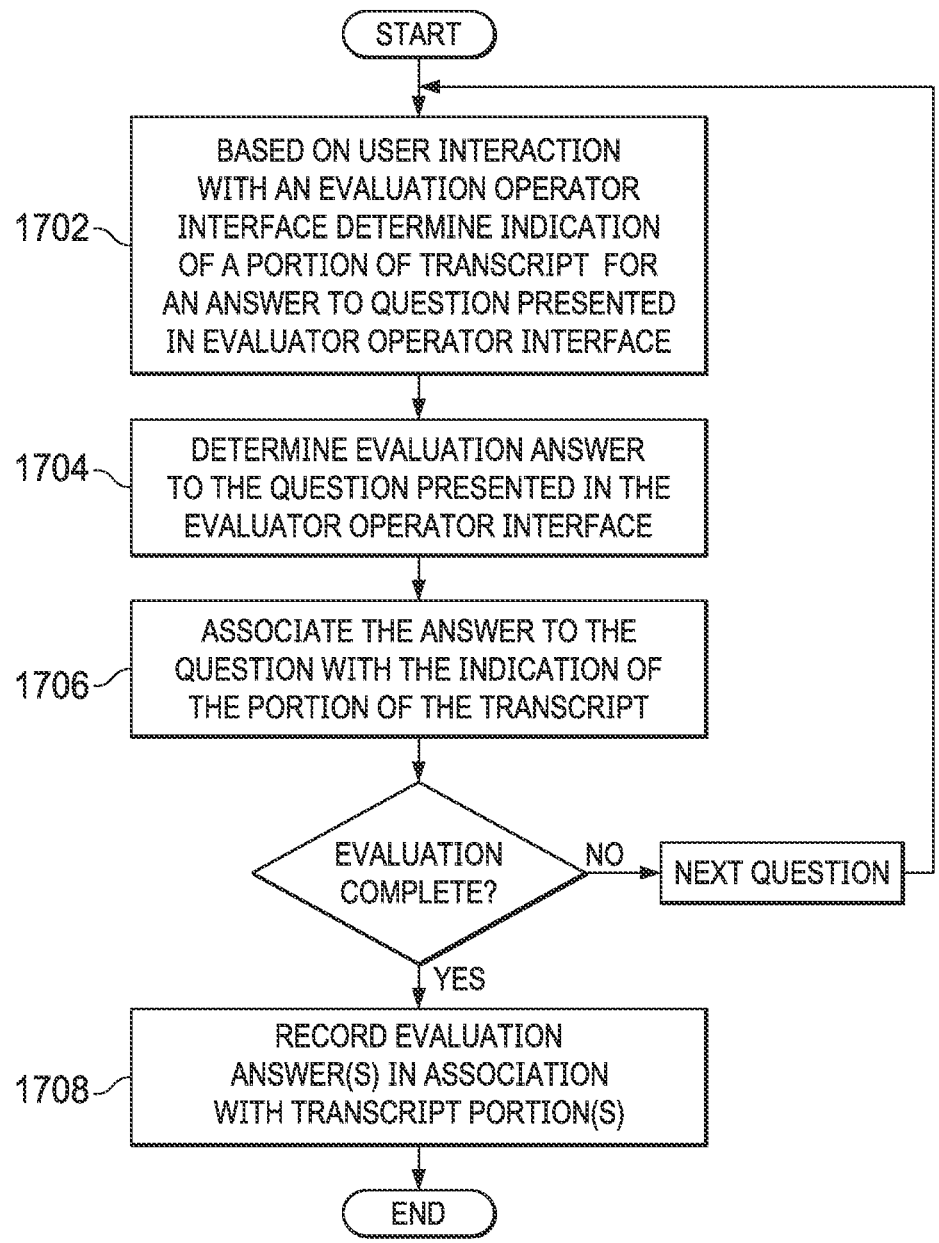
FIG. 17 is a flow chart illustrating one embodiment of receiving an evaluation from an evaluator.

FIG. 17 is a flow chart illustrating one embodiment of receiving an evaluation from an evaluator. The steps of FIG. 17 may be implemented by a processor of an evaluation system (e.g., evaluation system 200) that executes instructions stored on a computer readable medium. One or more steps of FIG. 17 can be implemented in a client tier (e.g., client tier 203) and one or more steps implemented at the server tier 202.

Based on user interaction with the evaluation operator interface, the evaluation operator interface determines an indication of a transcript portion to associate with the evaluation answer to a question presented in the evaluation operator interface (step 1702). For example, according to one embodiment, an evaluator interacts with a media player of the evaluation operator interface to pause the voice session and indicates to submit the evaluation answer to the presented question, and the evaluation operator interface records the temporal location at which the voice session is paused when the evaluator indicates to submit the evaluation answer. The temporal location can act as an indication of the portion of the transcript associated with the evaluation answer to the presented question. In another embodiment, the evaluation operator interface receives a request to associate the temporal location at which the voice session is currently paused with a particular presented question and associates the temporal location at which the voice session is paused with the presented question. This can allow the evaluator to tag questions that are presented together with different temporal locations. When the evaluator indicates to submit the evaluation answers to the questions, the evaluator operator interface associates the temporal locations with which the respective questions are tagged with the evaluation answers for the respective questions.

In another embodiment, the evaluator interacts with a transcript viewer of the evaluator operator interface to select text from the transcript and indicates to submit the evaluation answer to the to the question, and the evaluation operator interface creates a snippet containing the selected text when the evaluator indicates to submit evaluation answer to the presented question. The snippet or a reference to the snippet can act as an indication of the portion of the transcript associated with the evaluation answer to the presented question. In another embodiment, the evaluation operator interface receives a request to associate currently selected text with a particular presented question and associates the question with a snippet containing the selected text. This can allow the evaluator to associate questions that are presented together with different snippets. When the evaluator indicates to submit the evaluation answers to the questions, the evaluator operator interface associates the snippets with which the respective questions are associated with the evaluation answers for the respective questions.

Further, the evaluation operator interface determines an evaluation answer to a question presented in the evaluation operator interface (step 1704). According to one embodiment, an input to submit an evaluation or portion thereof containing a question can serve as an indication that the current answer selected for each presented question in the evaluator operator interface (whether an auto answer, a default answer, or an evaluator provided answer) is the evaluation answer to for that question. The evaluation operator interface associates the evaluation answer for the question determined in step 1704 with the indication of the portion of the transcript determined at step 1702 (step 1706). For example, the evaluation operator interface associates the evaluation answer to a question with the temporal location at which the voice session is currently paused, a temporal location tagged for the question, a snipped of currently selected text, a snippet of text associated with the question, or other indication of a transcript portion for the evaluation answer. According to one embodiment, steps 1702, 1704, 1706 are repeated for each question in an evaluation. The evaluation answer can thus be recorded in association with the indications of the transcript portions (e.g., in a completed evaluation 223 that includes an indication of a transcript portion 225 associated with the evaluation answer). For each auto scored question, the completed evaluation can include the auto answer determined by the evaluation system. If the evaluation answer is the same as the autoscore auto answer, the evaluation answer may simply be stored as a flag indicating that the autoscore auto answer is the evaluation answer—that is, that the evaluator did not select another answer to the question.

An evaluation system (e.g., evaluation system 200) can retune the auto answer parameters to increase accuracy. For example, the evaluation system may adjust an autoscore template (e.g., add a new lexicon, update an existing lexicon) or adjust other auto answer parameters. In addition, or in the alternative, the evaluation system can generate new lexicons to facilitate extending auto scoring.

As part of determining whether a set of auto answer parameters should be retuned, the evaluation system analyzes the evaluation answers to a question that was auto answered using the parameters to determine a confidence score for the auto answer parameters. If evaluators frequently changed the evaluation answers from the auto answers for the question, this can indicate that auto answer parameters require retuning. For example, the evaluator submitted answers to a question provided by evaluators over a number of transactions can be compared to the autoscore auto answers provided to the evaluators for the question to determine a confidence score for the auto score template that was used to autoscore the transactions for the questions. If the evaluators changed the answers to the question frequently from the autoscore auto answers, this could indicate an issue with the accuracy of the autoscore template. The evaluation system can be configured to retune auto answer parameters when the confidence level for a set of auto answer parameters drops below a threshold.

Returning briefly to FIG. 2, analytics component 242 can analyze completed evaluations 223 to determine if the evaluation system requires retuning. According to one embodiment, analytics component 242 can determine a confidence for a set of auto answer parameters and if the confidence falls below a threshold retune the auto answer parameters. For example, analytics component 242 can determine a confidence for an autoscore template and if the confidence does not meet a confidence threshold, retune the autoscore template.

Figure 18:
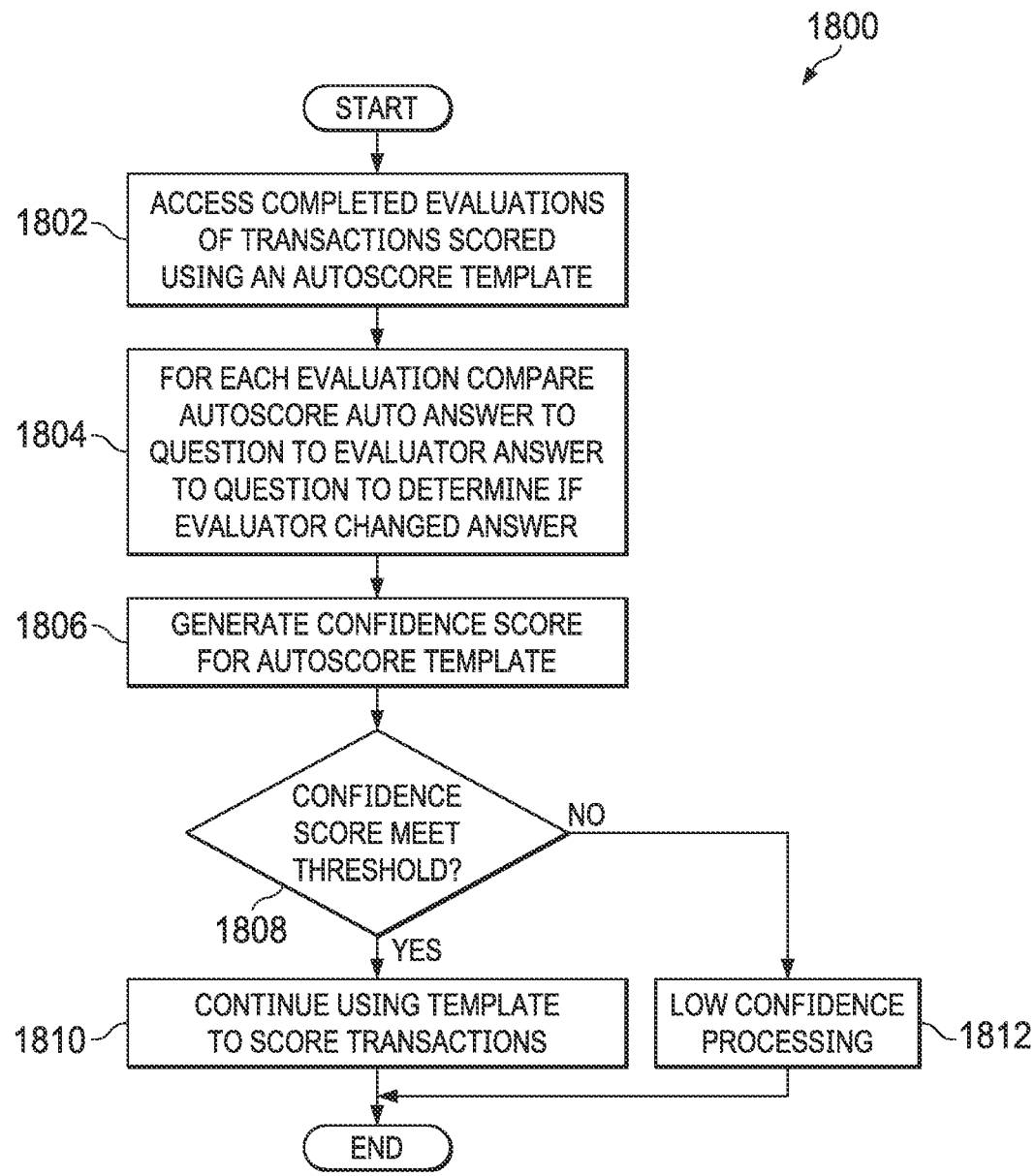
FIG. 18 is a flow chart illustrating one embodiment of a method for analyzing the results of evaluations.

With reference to FIG. 18, FIG. 18 is a flow chart illustrating one embodiment of a method 1800 for analyzing the results of evaluations. The steps of FIG. 18 may be implemented by a processor of an evaluation system (e.g., evaluation system 200) that executes instructions stored on a computer readable medium. The processor may be coupled to a data store, such as data store 118, data store 208 or data store 206. The processor may implement an analytics component, such as analytics component 242, to implement method 1800.

At step 1802, the evaluation system selects an autoscore template for analysis and identifies and accesses the completed evaluations of transactions scored using that autoscore template. For each of the evaluations identified in step 1802, the evaluation system compares the autoscore auto answer for a question associated with the autoscore template to the evaluation answer for the question to determine if the evaluator changed the answer from the auto answer answer—that is, the evaluation system compares the preselected answer to the question determined based on the autoscore to the answer submitted by the evaluator, which may or may not match the preselected answer (step 1804).

Based on the comparisons of step 1804, the evaluation system can determine a confidence score for the selected autoscore template (step 1806). According to one embodiment, for example, if the evaluation system determines that evaluators changed the answer to the question from the preselected answer in twenty five percent of the evaluations, the evaluation system can assign a confidence score of 75 to the selected autoscore template.

At step 1808, the evaluation system compares the confidence score for the autoscore template to a threshold. If the confidence score for the autoscore template meets the threshold, the evaluation system can use the autoscore template to score non-evaluated transactions (step 1810). If the confidence score for the autoscore template does not meet the confidence threshold, the evaluation system may implement low confidence processing for the autoscore template (step 1812).

Low confidence processing may involve a wide variety of processing. According to one embodiment for example, the evaluation system flags the autoscore template so that auto scorer 232 stops using the autoscore template. As another example, the evaluation system generates an alert to a user so that the user can retune the autoscore template. Other processing may also be implemented.

The steps of FIG. 18 are provided by way of example and may be performed in other orders. Moreover, steps may be repeated or omitted, or additional steps added. According to one embodiment, the confidence score for an autoscore template or other auto answer parameters is periodically redetermined to account for new transactions that have been autoscored using the autoscore template.

Returning to FIG. 2, analytics component 242 may produce reports based on analyzing evaluations 223 of transactions 215 scored by an autoscore template. FIG. 19A illustrates one embodiment of a confidence score report 1920 on an autoscore template. The report shows that evaluators who receive evaluations with an autoscore answer based on the "Standard Company Greeting" autoscore template frequently change the answer.

Returning to FIG. 2, analytics component 242 is configured to periodically review completed evaluations and determine confidence scores for auto answer parameters. For example, analytics component 242 may periodically review completed evaluations to determine confidence scores for autoscore templates that were used to generate autoscores for questions auto answered in the completed evaluations and store, in association with each such autoscore template, a confidence score.

AI engine 275 automatically tunes auto answer parameters. For example, AI engine 275 may adjust an autoscore template, an answer template, a question or a lexicon to tune the auto answer parameters. To this end, AI engine 275 periodically reads the confidence scores associated with auto answer parameters and compares the confidence scores to a threshold. If the confidence score for an auto answer parameter falls below a threshold, AI engine identifies an auto answer parameter as candidates for tuning. For example, if the confidence score for an autoscore template falls below a threshold, AI engine identifies the auto score template as a candidate for tuning.

AI engine 275 applies machine learning techniques to the results of evaluations and transcripts to automatically tune auto answer parameters. For example, AI engine 275 may adjust the lexicons incorporated in a selected autoscore template or parameters of an autoscore template, answer template or question to create revised autoscore templates, answer template or questions. AI engine 275 then applies the revised auto answer parameters to transactions 215 to generate revised auto answers for the evaluations. AI engine 275 further compares the revised auto answers to a question to the answers submitted by evaluators to determine if the revised auto answer parameters exhibit a higher confidence score than the prior auto answer parameters.

If the revised auto answer parameters result in a higher confidence level, the AI engine 275 can update the auto answer parameters for a question with the revised auto answer parameters. For example, if at least one revised autoscore template results in a higher confidence level than a prior autoscore template, the AI engine 275 can replace the selected autoscore template with the revised autoscore template. Revising a selected autoscore template may involve, for example, modifying or adding a lexicon 244, modifying or adding an autoscore template 246, modifying or adding an association between an autoscore template 246 and a lexicon 244, modifying or adding an association between a question 248 and autoscore template 246 or otherwise changing how transactions 215 are autoscored or a question auto-answered based on an autoscore template.

AI engine 275 can iterate through multiple revisions of auto answer parameters (e.g., multiple revisions of a template) until a confidence score that meets the confidence threshold is reached. In the example of FIG. 19B, AI engine 275 generates a first revised "Standard Company Greeting" autoscore template, applies the evaluation form, using the revised template, to transactions evaluated using the evaluation form and the previous version of the "Standard Company Greeting" autoscore template, compares the autoscore answers generated based on the revised autoscores according to the revised autoscore template to the evaluator answers for the transaction and determines a confidence score 1922 for the first revised autoscore template. If the confidence threshold is 80% for example, AI engine 275 can determine that the first revised "Standard Company Greeting" autoscore template does not meet the threshold and generate a second revised "Standard Company Greeting" autoscore template.

With reference to FIG. 19C, the AI engine 275 applies the evaluation form, using the second revised template, to transactions evaluated using the evaluation form and the original version of the "Standard Company Greeting" autoscore template, compares the autoscore answers generated based on the autoscores according to the second revised autoscore template to the evaluation answers for the transaction and determines a confidence score 1924 for the second revised autoscore template. In this example, the AI engine 275 replaces the original "Standard Company Greeting" autoscore template with the second revised "Standard Company Greeting" autoscore template because confidence score 1924 meets the confidence threshold.

In some embodiments, AI engine 275 generates new lexicons to facilitate the creation of new autoscore templates to extend autoscoring and auto answering. For example, AI engine 275 may periodically analyze completed evaluations with respect questions that were not auto answered to generate suggested lexicons for those questions. AI engine 275 can automatically create new autoscore templates to incorporate the new lexicons, iteratively testing and revising the autoscore templates or store the lexicons for use by a designer to design an auto-score template that incorporates the lexicon.

Figure 20:
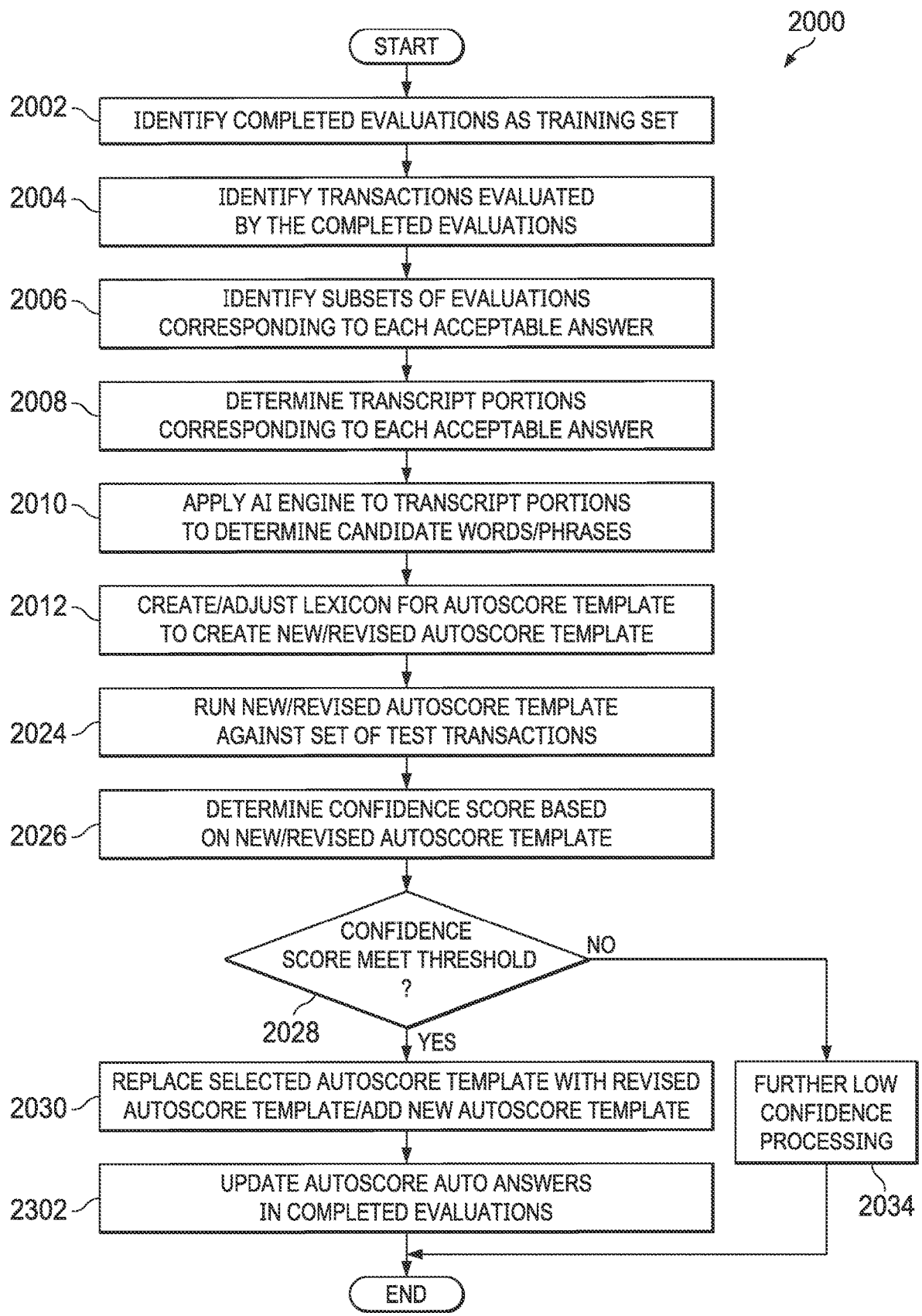
FIG. 20 is a flow chart illustrating one embodiment of a method for tuning auto answering.

FIG. 20 is a flow chart illustrating one embodiment of a method 2000 of tuning auto answering. The steps of FIG. 20 may be implemented by a processor of an evaluation system (e.g., evaluation system 200) that executes instructions stored on a computer readable medium. The processor may be coupled to a data store, such as data store 118, data store 208 or data store 206. The processor may implement an AI engine, such as AI engine 275, to implement method 2000. In some embodiments, method 2000 may be implemented to update an existing template that was previously used to auto answer a question. In other embodiments, the method may be performed to configure a new template.

The AI engine identifies a set of completed evaluations as a training set of evaluations (step 2002) and the set of transactions evaluated by the set of completed evaluations (step 2004). According to one embodiment, the set of completed evaluations contains evaluations that include evaluation answers to a question of interest for which an autoscore template is being developed. In another embodiment, the set of completed evaluations includes evaluations having autoscore auto answers generated based on a selected autoscore template to be updated (e.g., an autoscore template marked for low confidence processor or otherwise selected to be updated). In one embodiment, the metadata of a completed evaluation includes the identity of the questions that were answered, the identity of the autoscore templates, if any, that were used to autoscore the transaction that was evaluated and the identity of transaction that was evaluated.

Thus, step 2002 and 2004 may include querying a data store (e.g., data store 208) for evaluations that are associated with a selected question and/or selected autoscore template to identify the set of completed evaluations and using the metadata of the evaluations to identify the set of transactions.

At step 2006, the AI engine identifies subsets of the training set of completed evaluations based on acceptable answers to a selected question. For example, for a yes/no question, the AI engine may identify a first subset of completed evaluations as the subset of completed evaluations for which the evaluation answer to the question is "yes" and a second subset of completed evaluations for which the evaluation answer to the question is "no." As another example, for a question having the acceptable answers illustrated in FIG. 11, the AI engine may identify subsets of completed evaluations for each of the acceptable answers of "Excellent," "Exceeds Expectations," "Meets Expectations," "Needs Improvement," and "Poor."

If the question was auto answered, some embodiments may further subset the completed evaluations based on whether the autoscore was changed. For example, the AI engine may identify a first subset of completed evaluations as those completed evaluations in which the evaluation answers to the question are "yes" and the autoscore auto answers are "yes" (e.g., evaluations for which the evaluator did not change the answer from "yes"), a second subset of completed evaluations as those completed evaluations in which the evaluation answers to the question are "yes" and the autoscore auto answers are "no" (e.g., evaluations for which the evaluator changed the answer from "no" to "yes"), a third subset of completed evaluations as those completed evaluations in which the evaluation answers to the question are "no" and the autoscore auto answers are "no" (e.g., evaluations for which the evaluator did not change the answer from "no"), a fourth subset of completed evaluations as those completed evaluations in which the evaluation answers to the question are "no" and the autoscore auto answers are "yes" (e.g., evaluations for which the evaluator changed the answer from "yes" to "no").

At step 2008, the AI engine determines the transcript portions corresponding to each acceptable answer. As discussed above, each completed evaluation can include an indication of the transcript portion associated with the evaluation answer of that evaluation and thus the AI engine can determine the transcript portions corresponding to each acceptable answer. Returning to the example of a yes/no question in which the first subset of completed evaluations are evaluations in which the evaluation answer to the question is "yes" and the second subset of completed evaluations are the evaluations in which the evaluation answers to the question are "no", the AI engine can identify the transcript portions associated with the evaluation answers to the yes/no question in the first subset of completed evaluations as the set of transcript portions corresponding to the "yes" acceptable answer for the yes/no question. Similarly, the AI engine can identify the transcript portions associated with the evaluation answers to the yes/no question in the second subset of completed evaluations as the set of transcript portions corresponding to the "no" acceptable answer for the yes/no question.

At step 2010, the AI engine applies a machine learning model or rules to the transcript portions corresponding to the acceptable answers to extract words or phrases from the text portions that meet defined criteria. As will be appreciated there are a number of natural language processing and other machine learning models that can be applied to identify candidate words/phrases for each acceptable answer. The candidate words and phrases for an acceptable answer to a question may be words or phrases common to, the transcript portions corresponding to the acceptable answer, words or phrases that have a high frequency in the transcript portions corresponding to the acceptable answer, or words or phrases that otherwise exhibiting a degree of correlation with the acceptable answer and preferably having a lower degree of correlation with the other acceptable answers to the question.

According to one embodiment, the AI engine determines common words or phrases using term vectors that represent each transcript portion as a vector of terms or phrases, where each word or phrase is a dimension. As will be appreciated, the transcript portions may be pre-processed to remove stop words, normalize terms and to otherwise condition the transcript portions for text analysis. Generally, if a term or phrase appears in a transcript portion, the term or phrase has a nonzero value in the term vector for the transcript portion. The value for a term or phrase in a term vector may represent the frequency of the term in the transcript. For example, the value of a term or phrase in a term vector may be a term frequency-inverse document frequency (tf-idf) measure that reflects the importance of a word to a transcript portion in a corpus, where the corpus comprises the subset of transcript portions corresponding to an acceptable answer. Some search tools support queries for term vectors and can return the term vector, the term frequency, inverse document frequency, position, and offset information for terms in documents. Thus, the AI engine can query a search engine (e.g., search component 218) for the term vectors of the transcript portions corresponding to each acceptable answer.

According to one embodiment, the AI engine determines the set of potential candidate terms or phrases for an acceptable answer to a question based on the terms and phrases that are common or meet other defined criteria with respect to the transcript portions corresponding to that acceptable answer. For example, the AI engine can determine the set of potential candidate words or phrases for a first acceptable answer to the question as the set of terms or phrases that have nonzero values in all of the term vectors for the transcript portions corresponding to the acceptable answer. In other embodiments, the AI engine may determine the set of potential candidate words or phrases based on other defined criteria (e.g., the AI engine only selects as potential candidate words or phrases, the words or phrases that are common to the transcripts in the first subset of transcripts and have greater than a threshold term frequency or tf-idf for each of the transcripts in the first subset of transcripts, the words or phrases that appear in most of the term vectors of the transcript portions corresponding to the acceptable answer, or words or phrases that meet other criteria).

The AI engine can identify the words or phrases common to or having, having a threshold frequency in or meeting other defined criteria with respect to the transcript portions corresponding to one or more additional acceptable answers to the question and remove the words or phrases from the potential candidate words or phrases determined for the first acceptable answer. For example, the AI engine may determine words or phrases that have nonzero values in any of the term vectors for the transcript portions corresponding to the one or more additional acceptable answers and remove those words or phrases from the potential candidate words or phrases for the first acceptable answer to the question. In other embodiments, the AI engine may determine words or phrase to remove from the set of potential candidate words or phrases for the first acceptable answer based on other defined criteria (e.g., words or phrases that appear in most of the term vectors of the transcript portions corresponding to the one or more additional acceptable answers, or words or phrases that meet other defined criteria). The AI engine may also remove words or phrases based on other considerations. For example, the AI engine may also remove words or phrases that already appear in a lexicon of a selected autoscore template.

For a yes/no question then, the AI engine can determine a first subset of transcript portions as the transcript portions corresponding to the "yes" answer and a second subset of transcript portions as the transcript portions corresponding to the "no" answer. The AI engine can identify, as potential candidate words or phrases for the "yes" answer to the question, the words or phrases having a nonzero weight in all of term vectors of the first subset of transcript portions (that is, the transcript portions corresponding to a "yes" answer for the question). In other embodiments, the AI engine may determine the set of potential candidate words or phrases for the "yes" answer based on other defined criteria (e.g., words or phrases that appear in most of the term vectors of the transcript portions corresponding to the "yes" answer, or words or phrases that meet other defined criteria).

Continuing with the example of the yes/no question, the AI engine may further determine words or phrases that have nonzero values in any of the term vectors for the transcript portions corresponding to "no" answer and remove those words or phrases from the potential candidate words or phrases for the "yes" answer. In other embodiments, the AI engine may determine words or phrase to remove from the set of potential candidate words or phrases for the "yes" answer based on other defined criteria (e.g., words or phrases that appear in most of the term vectors of the transcript portions corresponding to the one or more additional acceptable answers, or words or phrases that meet other defined criteria). If the question was auto answered according to a selected auto score template, the AI engine may also remove words or phrases that already appear in a lexicon of the selected autoscore template.

As another example, for a question having the acceptable answers illustrated in FIG. 11 and associated with a selected autoscore template, the first subset of transcript portions may be the transcript portions corresponding to an answer of "Excellent" and a second subset of transcript portions may be the transcript portions corresponding to answers of "Exceeds Expectations," "Meets Expectations," "Needs Improvement," and "Poor." The AI engine can identify as potential candidate words or phrases for the "Excellent" acceptable answer, the words or phrases common to or meeting other criteria with respect to the first subset of transcripts and remove, from the potential candidate words or phrases for the "Excellent" acceptable answer, the words or phrases that also appear in or meet other criteria with respect to the second subset of transcript portions.

At step 2012, the AI engine creates a new lexicon that includes the set of candidate words or phrases determined for an acceptable answer. In some embodiments, the AI engine stores the new lexicon (e.g., as a lexicon 244) for later use in developing an autoscore template. In such an embodiment then, steps 2024-2034 can occur after a designer has designed a new autoscore template incorporating the lexicon and set up the answer template for the question to use the autoscore template.

In other embodiments the AI engine adds the new lexicon to an existing autoscore template to create a revised autoscore template (e.g., as part of low confidence processing 1812). The AI engine may use a configured default value for the lexicon weight value for the new lexicon and a default multiplier setting. In another embodiment, the AI engine adds a candidate word or phrase to an existing lexicon associated with the selected autoscore template to create a revised autoscore template. The existing lexicon weight and multiplier setting may be used. Each new lexicon entry added to a new lexicon or existing lexicon may have a weight of 1 or other weight (e.g. a weight based on frequency of the term or phrase).

If the question of interest (e.g., the question for which the candidate words or phrases were determined) was not previously autoscored, the AI engine can create a new auto score template that incorporates a new lexicon. In creating the new autoscore template, the AI engine may use a configured default value for the base score, lexicon weight value for the new lexicon, a default multiplier setting, a default target score setting and other default settings. Each new lexicon entry added to the new lexicon or existing lexicon may have a weight of 1 or other weight (e.g. a weight based on frequency of the term or phrase). If the question of interest—that is, the question for which the candidate words or phrases were determined—was not previously auto answered, the AI engine can create a modified answer template for the question from the existing answer template associated with the question and enable auto answer using the new autoscore template. The AI engine further sets the autoscore high, autoscore low for each acceptable answer to the question based on defaults or rules.

It can be noted that adding a candidate word or phrase to a new or existing lexicon can include adding a single candidate word or phrase at a time as a lexicon entry. This process can be repeated iteratively, adding a candidate word or phrase, testing the new or revised lexicon and iteratively adding a candidate word or phrase until a desired confidence is reached or all the candidate words and phrases have been added. In another embodiment, all the candidate words and phrases are added to a new or existing lexicon before a new or revised autoscore template is tested.

At step 2024, the AI engine can apply a selected autoscore template (e.g., new or revised auto score template created in step 2012) to a set of test transactions, which may include all the transactions identified in step 2004, a subset thereof or other test transactions for which there are completed evaluations that include evaluation answers to the question of interest. According to one embodiment, the AI engine performs method 1500 using the new or revised autoscore template on the set of test transactions to generate autoscores for the set of transactions, which may or may not have been autoscored previously. The AI engine further auto-answers the question associated with the new/revised autoscore template to generate autoscore auto answers based on the autoscores determined for the set of test transactions. For example, the AI engine may perform steps 1612, 1614, 1616, 1620 to determine autoscore auto answers for the test transactions. In some embodiments, such as when a question was not previously auto answered, this may include applying a new answer template for the question (e.g., an answer template that has been modified to enable auto answer and to include autoscore high and autoscore low values for each acceptable answer).

At step 2026, the AI engine determines a confidence score for the new/revised autoscore template. For example, the AI engine may perform steps 1602, 1604, 1606 using the evaluation answers to the question in the evaluations of the test transactions from the set of completed evaluations identified in step 2004 and the autoscore auto answers determined in step 2024. For each test transaction evaluations—for example, for each evaluation identified in step 2002—the evaluation system compares the autoscore auto answer for the question associated with the new/revised autoscore template to the evaluation answer for the question to determine if the evaluator would have changed the answer from the preselected answer had the new/revised autoscore template been used.

Based on the comparisons, the evaluation system can determine a confidence score for the new/revised autoscore template. According to one embodiment, for example, if the evaluation system determines that evaluators would have changed the answer to the question from the autoscore auto answer in twenty percent of the test transaction evaluations had the new/revised autoscore template been used, the evaluation system can assign a confidence score of 80 to the new/revised autoscore template.

The AI engine, at step 2028, compares the confidence score for the new/revised autoscore template to a threshold. If the confidence score for the autoscore template meets the threshold and, in the case of a revised autoscore template, is greater than the confidence score of the prior version of the autoscore template, the evaluation system can replace the prior version of the autoscore template with the revised autoscore template or add the new autoscore template and modified answer template (step 2030). The evaluation system updates the autoscore auto answers in the set of completed evaluations (step 2032) based on the new/revised autoscore template.

Thus, in the case of a revised autoscore template, subsequent autoscoring and auto answering is performed using a more accurate autoscore template. Moreover, by creating new autoscore templates and modifying an answer template for a question not previously auto answered, the AI engine extends the capability of the evaluation system to auto answer questions. As can be appreciated, it is thus possible to use the transcript portions to generate a lexicon for auto answering a question without depending on prior auto score parameters. In other words, an autogenerated autoscore template and/or answer template can be created for a question without the question having been autoscored or auto-answered previously. As such, some embodiments may provide a fully automated method to replace or complement a manual process of setting up the initial autoscore templates.

In another embodiment, the AI engine may store the new/revised autoscore template, revised lexicon or new lexicon and alert the user that a new/revised autoscore template or new/revised lexicon is available. The user can be responsible for approving the use of the new/revised autoscore template or new/revised lexicon.

If the confidence score for the new/revised autoscore template does not meet the confidence threshold, the evaluation system may implement further low confidence processing for the new/revised autoscore template (step 2034). Low confidence processing may involve a wide variety of processing. For example, the AI engine may iterate through additional sets of auto answer parameters, such as by adding additional candidate terms to an auto score template and incrementally adjusting parameters such as lexicon entry weights in a lexicon associated with the autoscore template, adjusting the lexicon weight assigned to a lexicon in the selected autoscore template, selecting or deselecting the multiplier for a lexicon, adjusting the base score. In the case of a new autoscore template for a question that has not previously been auto answered, the AI engine may also incrementally adjust the parameters of the answer template (e.g., adjust the autoscore high and autoscore low values for each acceptable answer) until the threshold confidence is reached or the AI engine reaches a stop event, such as completing x number of iterations without reaching the threshold confidence.

According to one embodiment for example, if a new/revised autoscore template does not reach the confidence threshold, the evaluation system flags the autoscore template so that the auto scorer does not use the autoscore template. In another embodiment, the AI engine simply discards the autoscore template. As another example, the AI engine may select a version of an autoscore template that has the highest confidence score as the active autoscore template to use going forward. As another example, the evaluation system generates an alert to a user so that the user can retune the autoscore template. Other processing may also be implemented.

The steps of FIG. 20 are provided by way of example and may be performed in other orders. Moreover, steps may be repeated or omitted, or additional steps added. According to some embodiments, the AI engine can also update auto score templates as described, for example, in U.S. patent application Ser. No. 15/990,279, entitled "Artificial Intelligence Based Data Processing System for Automatic Setting of Controls in An Evaluation Operator Interface," filed May 25, 2018 (published as United States Patent Publication No. 2019/0362645), which is hereby fully incorporated in its entirety by reference herein for all purposes.

Adding a candidate word or phrase to a new or existing lexicon can include adding a single candidate word or phrase as a lexicon entry. This process can be repeated iteratively, adding a candidate word or phrase, testing the revised lexicon and repeating until a desired confidence is reached or all the candidate words and phrases have been added. In another embodiment, all the candidate words and phrases may be added to a new or existing lexicon before the revised autoscore template is tested.

Figure 21:
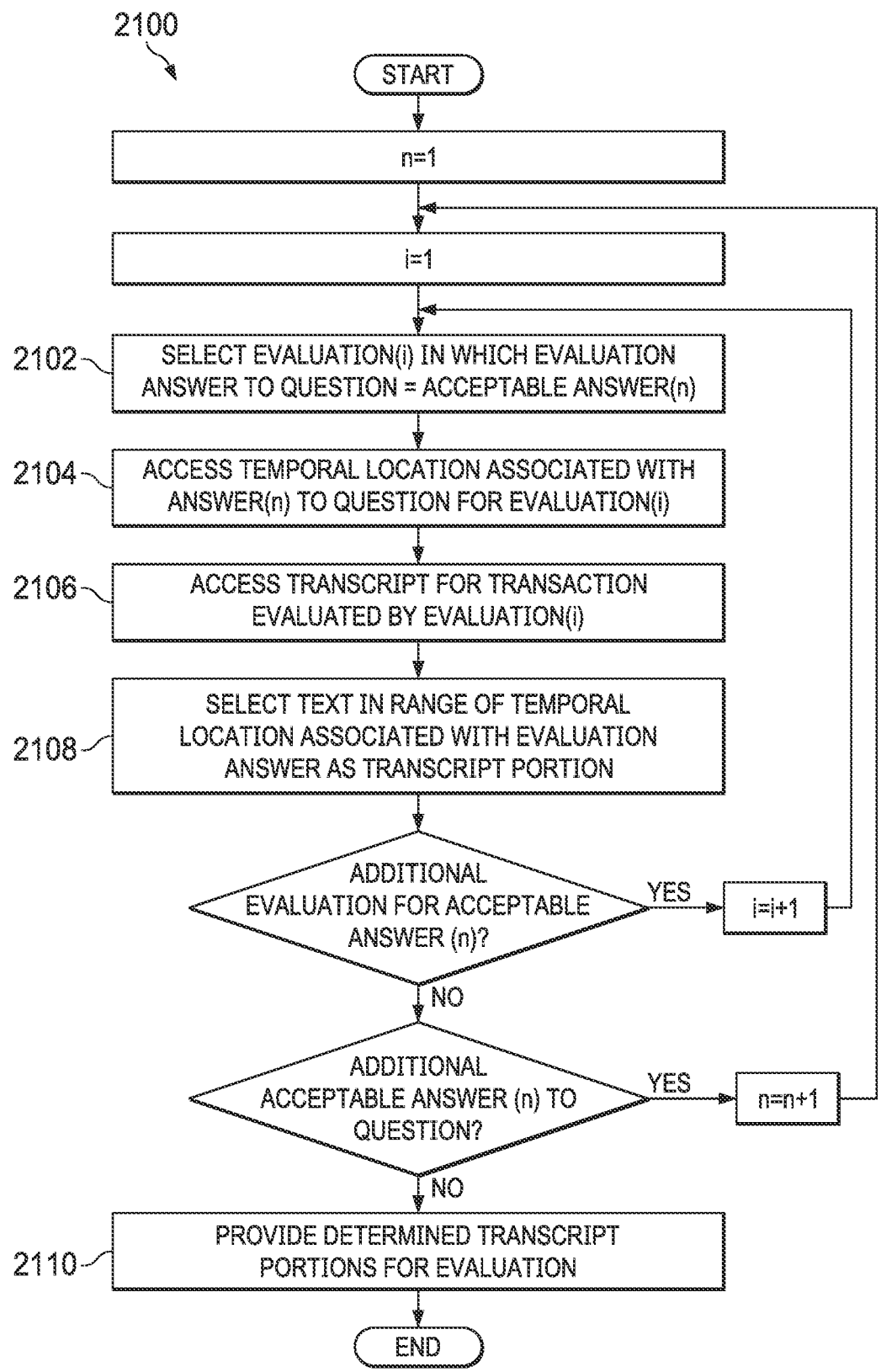
FIG. 21 is a flow chart illustrating another embodiment of determining a subset of transcript portions associated with acceptable answers.

FIG. 21 is a flow chart illustrating one embodiment of a method 2100 for determining the transcript portions corresponding to each acceptable answer where the transcript portions are indicated by temporal locations. The steps of FIG. 21 may be implemented by a processor of an evaluation system (e.g., evaluation system 200) that executes instructions stored on a computer readable medium. The processor may be coupled to a data store, such as data store 118, data store 208 or data store 206. The processor may implement an AI engine, such as AI engine 275, to implement method 2100.

At step 2102, the AI engine selects an evaluation from the subset of completed evaluations corresponding to the acceptable answer (e.g., a subset of completed evaluations determined at step 2006). That is, the AI engine selects a completed evaluation where the evaluation answer to the question matches the acceptable answer.

As discussed above, the completed evaluation may include an indication of a transcript portion associated with the evaluation answer where the indication is a temporal location. Thus, in step 2104, the AI engine can access a temporal location associated with the evaluation answer (and hence matching acceptable answers).

At step 2106, the AI engine accesses the transcript for the transaction evaluated by the evaluation selected in step 2102.

At step 2108, the AI engine selects, as the transcript portion corresponding to the acceptable answer, text in the transcript in a range of the temporal location associated with the evaluation answer that matches the acceptable answer.

For example, the AI engine may select as the transcript portion a certain number of words or characters before and/or after the temporal location. In another embodiment, the AI engine selects as the transcript portion words from the transcript that occur in a time range before and/or after the temporal location.

Steps 2102-2108 can be repeated for each evaluation corresponding to the acceptable answer to determine the subset of transcript portions corresponding to the acceptable answer. Moreover, the steps can be repeated for each acceptable answer until the subsets of transcript portions corresponding to each acceptable answer are identified. At step 2110, the subsets of transcript portions corresponding to each acceptable answer are passed for evaluation by the AI engine (e.g., according to step 2010). The steps of FIG. 20 are provided by way of example and may be performed in other orders. Moreover, steps may be repeated or omitted, or additional steps added.

Figure 22:
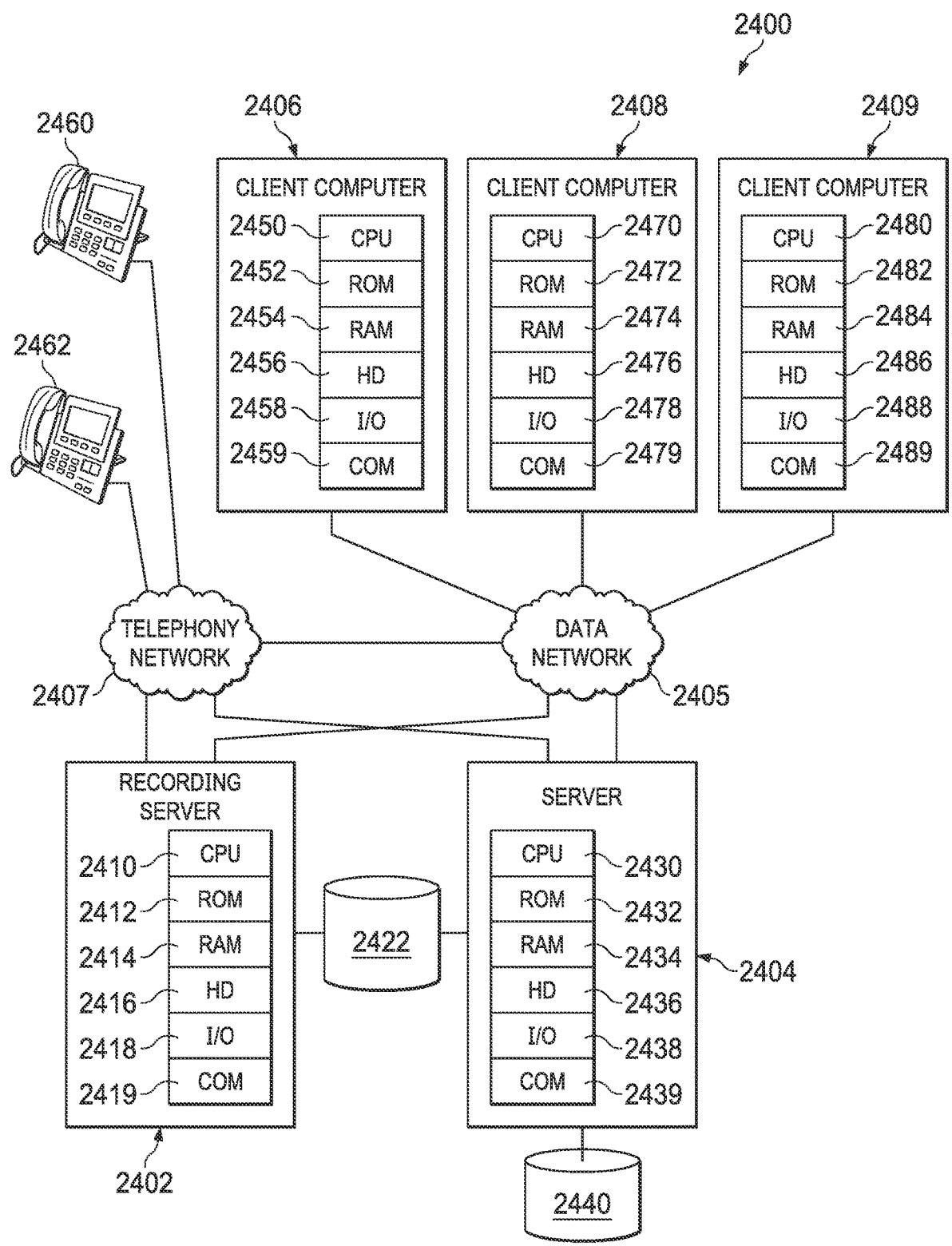
FIG. 22 is a diagrammatic representation of a distributed network computing environment.

FIG. 22 is a diagrammatic representation of a distributed network computing environment 2400 where embodiments disclosed herein can be implemented. In the example illustrated, network computing environment 2400 includes a data network 2405 that can be bi-directionally coupled to client computers 2406, 2408, 2409 and server computers 2402 and 2404. Network 2405 may represent a combination of wired and wireless networks that network computing environment 2400 may utilize for various types of network communications known to those skilled in the art. Data network 2405 may be, for example, a WAN, LAN, the Internet or a combination thereof.

Further, network computing environment includes a telephony network 2407 to connect server computer 2402 and server computer 2404 to call center voice instruments 2460 and external voice instruments 2462. Telephony network 2407 may utilize various types of voice communication known in the art. Telephony network 2407 may comprise, for example, a PTSN, PBX, VOIP network, cellular network or combination thereof.

For the purpose of illustration, a single system is shown for each computer 2402, 2404, 2406, 2408 and 2409 and a single voice instrument is shown for each of voice instruments 2460, 2462. However, each computer 2402, 2404, 2406, 2408 and 2409 may comprise a plurality of computers (not shown) interconnected to each other over network 2405. For example, a plurality of server computers 2402, a plurality of computers 2404, a plurality of computers 2406, a plurality of computers 2408 and a plurality of computer 2409 may be coupled to network 2405. Furthermore, a plurality of server computers 2402, plurality of computers 2404, a plurality of voice instruments 2462 and a plurality of voice instruments 2460 may be coupled to telephony network 2407.

Server computer 2402 can include can include central processing unit ("CPU") 2410, read-only memory ("ROM") 2412, random access memory ("RAM") 2414, hard drive ("HD") or storage memory 2416, input/output device(s) ("I/O") 2418 and communication interface 2419. I/O 2418 can include a keyboard, monitor, printer, electronic pointing device (e.g., mouse, trackball, stylus, etc.), or the like. Communications interface may include a communications interface, such as a network interface card, to interface with network 2405 and phone interface cards to interface with telephony network 2407.

According to one embodiment, server computer 2402 may include computer executable instructions stored on a non-transitory computer readable medium coupled to a processor. The computer executable instructions of server computer 2402 may be executable to provide a recording system. For example, the computer executable instructions may be executable to provide a recording server, such as recording server 114, or an ingestion server, such as ingestion server 116. Server computer 2402 may implement a recording system that records voice sessions between a voice instrument 2460 and a voice instrument 2462 (e.g., between a call center agent voice instrument and a customer voice instrument) and data sessions with client computer 2406. Server computer 2402 stores session data for voice and data sessions in transaction data store 2422.

Server computer 2404 can comprise CPU 2430, ROM 2432, RAM 2434, HD 2436, I/O 2438 and communications interface 2439. I/O 2438 can include a keyboard, monitor, printer, electronic pointing device (e.g., mouse, trackball, stylus, etc.), or the like. Communications interface 2439 may include a communications interface, such as a network interface card, to interface with network 2405 and telephony interface card to interface with telephony network 2407.

According to one embodiment, server computer 2404 may include a processor (e.g., CPU 2430) coupled to a data store configured to store transactions (e.g., transaction metadata and associated recorded sessions). For example, server computer 2404 may include CPU 2430 coupled to data store 2422 via network 2405. Server computer 2404 may further comprise computer executable instructions stored on a non-transitory computer readable medium coupled to the processor. The computer executable instructions of server 2404 may be executable to provide an evaluation system.

The computer executable instructions may be executable to provide a variety of services to client computer 2406, 2408, such as providing interfaces to allow a designer to design lexicons, autoscore templates, questions, answer templates and evaluation forms. The computer executable instructions of server computer 2404 may be further executable to provide evaluations to evaluators. The computer executable instructions may further utilize data stored in a data store 2440. According to one embodiment, the computer executable instructions of server computer 2404 may be executable to implement server tier 202.

Computer 2406 can comprise CPU 2450, ROM 2452, RAM 2454, HD 2456, I/O 2458 and communications interface 2459. I/O 2458 can include a keyboard, monitor, printer, electronic pointing device (e.g., mouse, trackball, stylus, etc.), or the like. Communications interface 2459 may include a communications interface, such as a network interface card, to interface with network 2405. Computer 2406 may comprise call center agent software to allow a call center agent to participate in a data session that is recorded by server computer 2402. Computer 2406 may be an example of an agent computer 164 or a supervisor computer 174.

Computer 2008 can similarly comprise CPU 2470, ROM 2472, RAM 2474, HD 2476, I/O 2478 and communications interface 2479. I/O 2478 can include a keyboard, monitor, printer, electronic pointing device (e.g., mouse, trackball, stylus, etc.), or the like. Communications interface 2479 may include a communications interface, such as a network interface card, to interface with network 2405. Computer 2408 may comprise a web browser or other application that can cooperate with server computer 2404 to allow a user to define lexicons, autoscore templates, questions, answer templates and evaluation forms. Computer 2408 may be an example of a client computer 180. According to one embodiment, computer 2406 or computer 2408 may implement client tier 203.

Computer 2409 can similarly comprise CPU 2480, ROM 2482, RAM 2484, HD 2486, I/O 2488 and communications interface 2489. I/O 2488 can include a keyboard, monitor, printer, electronic pointing device (e.g., mouse, trackball, stylus, etc.), or the like. Communications interface 2489 may include a communications interface, such as a network interface card, to interface with network 2405. Computer 2409 may comprise a web browser that allows an evaluator to complete evaluations. Computer 2409 may be another example of a client computer 180.

Call center voice instrument 2460 and external voice instrument 2462 may operate according to any suitable telephony protocol. Call center voice instrument 2460 can be an example of agent voice instrument 162 or supervisor voice instrument 172 and external voice instrument 2462 may be an example of a customer voice instrument.

Each of the computers in FIG. 22 may have more than one CPU, ROM, RAM, HD, I/O, or other hardware components. For the sake of brevity, each computer is illustrated as having one of each of the hardware components, even if more than one is used. Each of computers 2402, 2404, 2406, 2408, 2409 is an example of a data processing system. ROM 2412, 2432, 2452, 2472 and 2482; RAM 2414, 2434, 2454, 2474 and 2484; HD 2416, 2436, 2456, 2476 and 2486; and data store 2422, 2440 can include media that can be read by 2410, 2430, 2450, 2470 and 2480. These memories may be internal or external to computers 2402, 2404, 2406, 2408 or 2409.

Portions of the methods described herein may be implemented in suitable software code that may reside within ROM 2412, 2432, 2452, 2472 and 2482; RAM 2414, 2434, 2454, 2474 and 2484; HD 2416, 2436, 2456, 2476 and 2486. In addition to those types of memories, the instructions in an embodiment disclosed herein may be contained on a data storage device with a different computer-readable storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A data processing system for artificial intelligence-based setting of controls in an evaluation interface, comprising:
   a processor;
   a data store storing:
      a plurality of transactions, each of the plurality of transactions comprising a voice session recording of an inbound call recorded by a call center recording system and a transcript of the voice session;
      a plurality of completed evaluations, each completed evaluation of the plurality of completed evaluations being an evaluation of a corresponding transaction from the plurality of transactions and including an evaluation answer to a question and an indication of a transcript portion associated with the evaluation answer, the transcript portion being a portion of the transcript from the corresponding transaction;
   a non-transitory computer-readable medium storing computer-readable instructions executable by the processor, the computer-readable instructions comprising instructions for:
      determining a word or phrase common to a first set of transcript portions associated with the evaluation answer;

creating a first set of auto answer parameters that includes the word or phrase;

auto answering the question for a set of test transactions from the plurality of transactions to generate an auto answer for each test transaction of the set of test transactions;

based on a determination that the first set of auto answer parameters auto answered the question with a threshold level of accuracy, configuring an evaluation system to use the first set of auto answer parameters to preset an answer control in an evaluation operator interface;

providing the evaluation operator interface to a client computer for evaluating a first transaction that includes a first voice session recording and a first transcript of the first voice session recording, the evaluation operator interface comprising:

the answer control to allow a first evaluator to provide a first evaluation answer to the question;

a media player to play the first voice session recording and including a control to allow the first evaluator to pause the first voice session recording; and a transcript viewer to display the first transcript, the evaluation operator interface operable to record a first temporal location in the first voice session recording at which the first voice session recording is paused when the first evaluator inputs the first evaluation answer to the question; and storing a first completed evaluation for the first transaction, the first completed evaluation including the first evaluation answer and the first temporal location.

2. The data processing system of claim 1:

wherein the data store further stores a prior set of auto answer parameters previously used by the evaluation system to preset the answer control in the evaluation operator interface, the prior set of auto answer parameters comprising a lexicon;

wherein determining the word or phrase common to the first set of transcript portions associated with the evaluation answer includes determining that the word or phrase is not included in the lexicon; and wherein creating the first set of auto answer parameters comprises revising the prior set of auto answer parameters by updating the lexicon to include the word or phrase.

3. The data processing system of claim 2, wherein determining the word or phrase common to the first set of transcript portions further comprises determining the word or phrase is not in a second set of transcript portions.

4. The data processing system of claim 2, wherein the computer-readable instructions comprise instructions for:

for each test transaction in the set of test transactions, comparing the auto answer determined for the test transaction to the evaluation answer from a completed evaluation corresponding to the test transaction;

based on the comparing, determining a confidence for the first set of auto answer parameters;

comparing the confidence for the first set of auto answer parameters to a confidence for the prior set of auto answer parameters; and based on a determination that the first set of auto answer parameters are more accurate than the prior set of auto answer parameters, determining that the first set of auto answer parameters auto answered the question with the threshold level of accuracy.

5. The data processing system of claim 1, wherein the indication of the transcript portion comprises a temporal location.

6. The data processing system of claim 5, wherein the computer-readable instructions comprise instructions for:

determining the transcript portion by selecting text that is within a defined range of the temporal location from the transcript of the corresponding transaction.

7. The data processing system of claim 1, wherein the indication of the transcript portion comprises an indication of text selected by an evaluator as being the transcript portion associated with the evaluation answer.

8. The data processing system of claim 1, wherein the transcript viewer provides a tool to allow the first evaluator to select a first portion of the first transcript to associate with the first evaluation answer and wherein the first completed evaluation includes an indication of the first portion of the first transcript for the first evaluation answer.

9. The data processing system of claim 1, wherein determining the word or phrase common to the first set of transcript portions comprises comparing word vectors that represent the first set of transcript portions.

10. The data processing system of claim 1, wherein the computer-readable instructions comprise instructions for:

querying a search index for term frequencies of terms in the first set of transcript portions; and determining the word or phrase common to the first set of transcript portions based on the term frequencies.

11. A computer program product comprising a non-transitory computer-readable medium storing computer-readable instructions, the computer-readable instructions comprising instructions for:

accessing a data store storing:

a plurality of transactions, each of the plurality of transactions comprising a voice session recording of an inbound call recorded by a call center recording system and a transcript of the voice session;

a plurality of completed evaluations, each completed evaluation of the plurality of completed evaluations being an evaluation of a corresponding transaction from the plurality of transactions and including an evaluation answer to a question and an indication of a transcript portion associated with the evaluation answer, the transcript portion being a portion of the transcript from the corresponding transaction;

determining a word or phrase common to a first set of transcript portions;

creating a first set of auto answer parameters that includes the word or phrase;

auto answering the question for a set of test transactions from the plurality of transactions to generate an auto answer for each test transaction of the set of test transactions;

based on a determination that the first set of auto answer parameters auto answered the question with a threshold level of accuracy, configuring an evaluation system to use the first set of auto answer parameters to preset an answer control in an evaluation operator interface;

providing the evaluation operator interface to a client computer for evaluating a first transaction that includes a first voice session recording and a first transcript of the first voice session recording, the evaluation operator interface comprising:

the answer control to allow a first evaluator to provide a first evaluation answer to the question;

a media player to play the first voice session recording and including a control to allow the first evaluator to pause the first voice session recording; and a transcript viewer to display the first transcript, the evaluation operator interface operable to record a first temporal location in the first voice session recording at which the first voice session recording is paused when the first evaluator inputs the first evaluation answer to the question; and storing a first completed evaluation for the first transaction, the first completed evaluation including the first evaluation answer and the first temporal location.

12. The computer program product of claim 11:

wherein the data store further stores a prior set of auto answer parameters previously used by the evaluation system to preset the answer control in the evaluation operator interface, the prior set of auto answer parameters comprising a lexicon;

wherein automatically determining the word or phrase common to the first set of transcript portions associated with the evaluation answer includes determining that the word or phrase is not included in the lexicon; and wherein creating the first set of auto answer parameters comprises revising the prior set of auto answer parameters by updating the lexicon to include the word or phrase.

13. The computer program product of claim 12, wherein determining the word or phrase common to the first set of transcript portions further comprises determining the word or phrase is not in a second set of transcript portions.

14. The computer program product of claim 13, wherein the computer-readable instructions comprise instructions for:

for each test transaction in the set of test transactions, comparing the auto answer determined for the test transaction to the evaluation answer from a completed evaluation corresponding to the test transaction;

based on the comparing, determining a confidence for the first set of auto answer parameters;

comparing the confidence for the first set of auto answer parameters to a confidence for the prior set of auto answer parameters; and based on a determination that the first set of auto answer parameters are more accurate than the prior set of auto answer parameters, determining that the first set of auto answer parameters auto answered the question with the threshold level of accuracy.

15. The computer program product of claim 12, wherein the indication of the transcript portion comprises a temporal location.

16. The computer program product of claim 15, wherein the computer-readable instructions comprise instructions for:

determining the transcript portion by selecting text that is within a defined range of the temporal location from the transcript of the corresponding transaction.

17. The computer program product of claim 12, wherein the indication of the transcript portion comprises an indication of text selected by an evaluator as being the transcript portion associated with the evaluation answer.

18. The computer program product of claim 12, wherein the transcript viewer provides a tool to allow the first evaluator to select a first portion of the first transcript to associate with the first evaluation answer and wherein the first completed evaluation includes an indication of the first portion of the first transcript for the first evaluation answer.

19. The computer program product of claim 12, wherein determining the word or phrase common to the first set of transcript portions comprises comparing word vectors that represent the first set of transcript portions.

20. The computer program product of claim 12, wherein the computer-readable instructions comprise instructions for:

querying a search index for term frequencies of terms in the first set of transcript portions; and determining the word or phrase common to the first set of transcript portions based on the term frequencies.

\* \* \* \* \*